(12) United States Patent
Boyeau et al.

(10) Patent No.: US 10,415,755 B2
(45) Date of Patent: Sep. 17, 2019

(54) SEALED AND THERMALLY INSULATED TANK HAVING A SECONDARY SEALING MEMBRANE EQUIPPED WITH A CORNER ARRANGEMENT WITH CORRUGATED METAL SHEETS

(71) Applicant: GAZTRANSPORT ET TECHNIGAZ, Saint Remy les Chevreuse (FR)

(72) Inventors: Marc Boyeau, Villepreux (FR); Antoine Philippe, Gif sur Yvette (FR); Sébastien Delanoe, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 0 days.

(21) Appl. No.: 15/738,894

(22) PCT Filed: Jul. 5, 2016

(86) PCT No.: PCT/FR2016/051699
§ 371 (c)(1),
(2) Date: Dec. 21, 2017

(87) PCT Pub. No.: WO2017/006044
PCT Pub. Date: Jan. 12, 2017

(65) Prior Publication Data
US 2018/0180223 A1    Jun. 28, 2018

(30) Foreign Application Priority Data

Jul. 6, 2015  (FR) .................................... 15 56356

(51) Int. Cl.
*F17C 3/00*   (2006.01)
*F17C 3/02*   (2006.01)
(Continued)

(52) U.S. Cl.
CPC .............. *F17C 3/027* (2013.01); *F04B 15/08* (2013.01); *F16L 59/141* (2013.01); *F17C 3/06* (2013.01);
(Continued)

(58) Field of Classification Search
CPC .... F17C 3/027; F17C 3/06; F17C 5/02; F17C 13/004; F17C 2227/0135;
(Continued)

(56) References Cited

U.S. PATENT DOCUMENTS 4,128,069 A * 12/1978 Kotcharian ............... F17C 3/04
114/74 A
4,128,187 A * 12/1978 Okamoto .............. F17C 13/001
114/74 A
(Continued)

FOREIGN PATENT DOCUMENTS

WO    2014/167213 A2    10/2014
WO    2014/167214 A2    10/2014

OTHER PUBLICATIONS

International Search Report for PCT/FR2016/051699 filed Jul. 5, 2016.

*Primary Examiner* — Ernesto A Grano
(74) *Attorney, Agent, or Firm* — Notaro, Michalos & Zaccaria P.C.

(57) ABSTRACT

A sealed and thermally insulated tank for storage of a fluid, having a plurality of multilayer walls. A first of the walls has a secondary thermally insulating barrier including a first insulating panel along the intersection between the load-bearing structure of first wall and the load-bearing structure of an adjacent second wall. A second insulating panel is juxtaposed with the first insulating panel along one edge of the first panel opposing the second wall. The first wall has a secondary sealing membrane including a first corrugated metal sheet welded to a small metal plate of the first (Continued)

insulating panel; and a second corrugated metal sheet welded to the small metal plate of the second insulating panel. The first metal sheet and the second metal sheet are welded together via a joggled edge permitting the first and the second metal sheets to be lap welded to one another.

21 Claims, 13 Drawing Sheets

(51) Int. Cl.
 *F04B 15/08* (2006.01)
 *F16L 59/14* (2006.01)
 *F17C 3/06* (2006.01)
 *F17C 5/02* (2006.01)
 *F17C 13/00* (2006.01)

(52) U.S. Cl.
 CPC .............. *F17C 5/02* (2013.01); *F17C 13/004* (2013.01); *F04B 2015/081* (2013.01); *F17C 2201/0157* (2013.01); *F17C 2201/052* (2013.01); *F17C 2203/0333* (2013.01); *F17C 2203/0358* (2013.01); *F17C 2203/0631* (2013.01); *F17C 2205/0355* (2013.01); *F17C 2221/033* (2013.01); *F17C 2223/0161* (2013.01); *F17C 2223/033* (2013.01); *F17C 2227/0135* (2013.01); *F17C 2260/018* (2013.01); *F17C 2270/0107* (2013.01)

(58) Field of Classification Search
 CPC .......... F17C 2205/0355; F17C 70/0107; F17C 2223/033; F17C 2223/0161; F17C 2221/033; F17C 2203/0631; F17C 2203/0358; F17C 2201/052; F17C 2201/0157; F17C 2260/018; F04B 15/08; F04B 2015/081; F16L 59/141
 USPC ..................................................... 220/560.06
 See application file for complete search history.

(56) References Cited

U.S. PATENT DOCUMENTS

| | | | | |
|---|---|---|---|---|
| 5,269,247 A * | 12/1993 | Jean | ............ | B63B 25/16 114/74 A |
| 5,450,806 A * | 9/1995 | Jean | ............ | B63B 25/16 114/74 A |
| 5,586,513 A * | 12/1996 | Jean | ............ | B32B 15/08 114/74 A |
| 6,145,690 A * | 11/2000 | Dhellemmes | ............ | B63B 25/16 220/4.12 |
| 6,374,761 B1 * | 4/2002 | Dhellemmes | ............ | B63B 3/68 114/74 A |
| 7,137,345 B2 * | 11/2006 | Noble | ............ | B63B 25/08 114/74 R |
| 7,171,916 B2 * | 2/2007 | Yang | ............ | B63B 3/68 114/74 A |
| 7,204,195 B2 * | 4/2007 | Yang | ............ | B63B 25/14 114/74 A |
| 7,464,658 B2 * | 12/2008 | Dhellemmes | ............ | B63B 25/16 114/74 A |
| 7,555,991 B2 * | 7/2009 | Dhellemmes | ............ | B63B 25/16 114/74 A |
| 7,690,365 B2 * | 4/2010 | Lee | ............ | B63B 25/14 123/27 GE |
| 7,717,289 B2 * | 5/2010 | Yang | ............ | B63B 25/16 220/560.07 |
| 7,819,273 B2 * | 10/2010 | Yang | ............ | F17C 13/001 220/560.07 |
| 7,841,288 B2 * | 11/2010 | Lee | ............ | F17C 7/02 114/256 |
| 7,934,353 B2 * | 5/2011 | Dhellemmes | ............ | B32B 3/06 52/783.1 |
| 8,028,724 B2 * | 10/2011 | Lee | ............ | F17C 3/00 141/11 |
| 8,186,292 B2 * | 5/2012 | Yoo | ............ | F17C 3/00 114/74 A |
| 8,261,879 B2 * | 9/2012 | Yang | ............ | E04G 3/28 104/124 |
| 8,317,056 B2 * | 11/2012 | Lee | ............ | F17C 13/001 220/560.12 |
| 8,430,263 B2 * | 4/2013 | Jordan | ............ | F17C 3/022 114/74 A |
| 8,444,803 B2 * | 5/2013 | Gomart | ............ | B63B 25/16 156/295 |
| 8,776,707 B2 * | 7/2014 | Joh | ............ | B63B 3/68 114/75 |
| 8,906,189 B2 * | 12/2014 | Mercier | ............ | B32B 37/12 156/272.6 |
| 8,959,930 B2 * | 2/2015 | Lee | ............ | F17C 13/004 62/48.1 |
| 8,985,042 B2 * | 3/2015 | Canler | ............ | F17C 3/027 114/74 A |
| 9,017,565 B2 * | 4/2015 | Joh | ............ | B63B 25/16 156/292 |
| 9,086,188 B2 * | 7/2015 | Lee | ............ | C10L 3/10 |
| 9,285,164 B2 * | 3/2016 | Wilhelm | ............ | E04H 7/04 |
| 9,291,308 B2 * | 3/2016 | Ezzarhouni | ............ | F17C 3/022 |
| 9,360,159 B2 * | 6/2016 | Gazeau | ............ | F17C 3/027 |
| 10,072,435 B2 * | 9/2018 | Lisin | ............ | E04H 7/06 |
| 10,072,798 B2 * | 9/2018 | Herry | ............ | F17C 3/027 |
| 10,106,242 B1 * | 10/2018 | Halamandaris | ............ | B64C 1/403 |

* cited by examiner

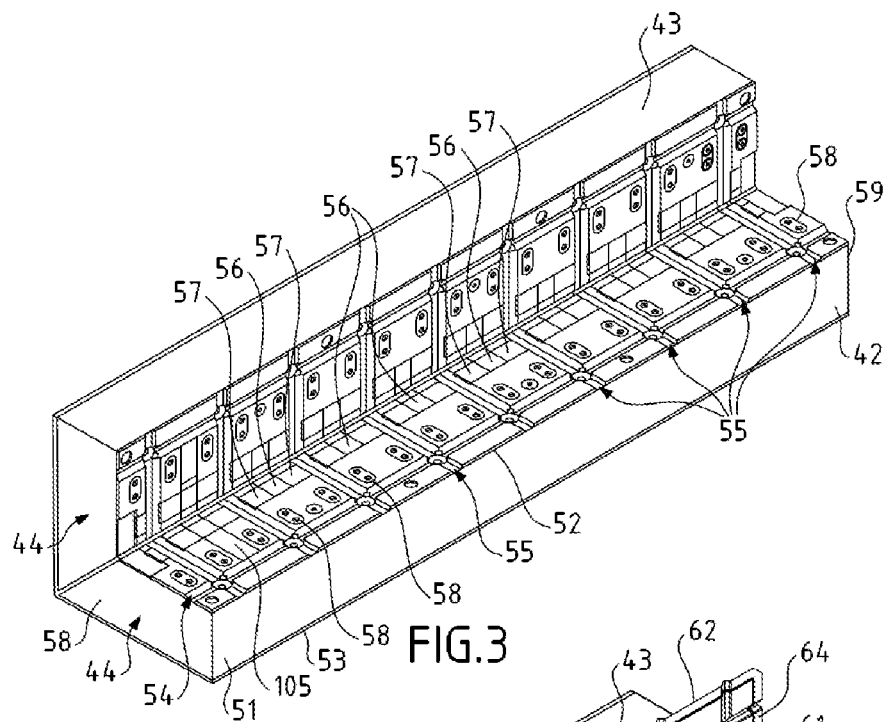
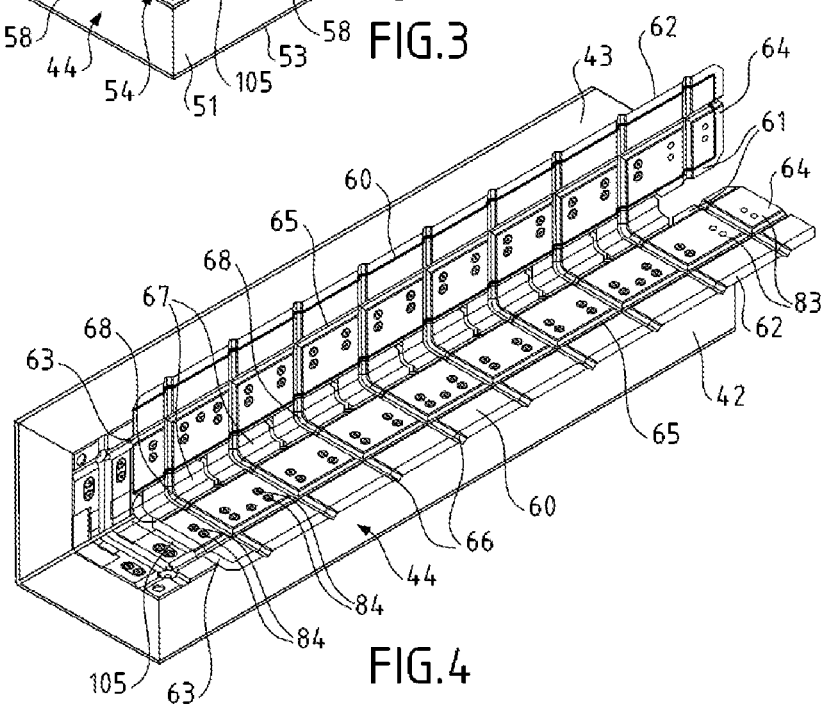

SEALED AND THERMALLY INSULATED TANK HAVING A SECONDARY SEALING MEMBRANE EQUIPPED WITH A CORNER ARRANGEMENT WITH CORRUGATED METAL SHEETS

TECHNICAL FIELD

The invention relates to the field of sealed and thermally insulated tanks, comprising membranes, for the storage and/or the transport of fluid such as a cryogenic fluid.

Sealed and thermally insulated tanks comprising membranes are used, in particular, for the storage of liquefied natural gas (LNG) which is stored at atmospheric pressure, at approximately −162° C. These tanks may be installed on land or on a floating installation. In the case of a floating installation, the tank may be designed for the transport of liquefied natural gas or for receiving liquefied natural gas used for fuel for the propulsion of the floating installation.

TECHNICAL BACKGROUND

A sealed and thermally insulated tank for the storage of liquefied natural gas which is integrated in a load-bearing structure such as the double hull of a marine vessel designed for the transport of liquefied natural gas is disclosed in the document WO 2014 167213. The tank has a multilayer structure successively having, in the direction of the thickness from the outside to the inside of the tank, a secondary thermally insulating barrier retained on the load-bearing structure, a secondary sealing membrane bearing against the secondary thermally insulating barrier, a primary thermally insulating barrier bearing against the secondary sealing membrane and a primary sealing membrane designed to be in contact with the liquefied natural gas contained in the tank.

The secondary sealing membrane consists of a plurality of metal sheets having two perpendicular corrugations protruding toward the outside of the tank and thus permitting the secondary sealing membrane to be deformed under the action of thermal stresses generated by the fluid stored in the tank. The secondary thermally insulating barrier has a plurality of insulating panels of standard dimensions juxtaposed against the load-bearing structure and separated by interstices. Each metal sheet of the secondary sealing membrane has a length and a width substantially corresponding to those of the standard insulating panels of the secondary thermally insulating barrier and is arranged offset relative to said insulating panels such that it extends across four of the insulating panels and that the corrugations of the corrugated metal sheets are inserted inside the interstices separating said insulating panels.

In the region of a corner between two walls, the secondary thermally insulating barrier has an angled structure composed of two angled insulating panels which are respectively arranged against the load-bearing structure of both of the two walls and together form a corner of the secondary thermally insulating barrier. Each of these two angled insulating panels has on its internal face a metal connecting strip. A metal angle plate is welded to the metal connecting strip of each of the two angled insulating panels so as to provide the seal of the secondary sealing membrane. At the edge of each wall, corrugated metal sheets provide the connection of the secondary sealing membrane to the angled structure by being welded to the metal connecting strips. The dimensions of the metal sheets at the edge of the wall may be different from those of the other metal sheets, so as to be adapted to the dimensions of the angled structure.

The arrangement of the secondary thermally insulating barrier and of the aforementioned secondary sealing membrane, however, is not entirely satisfactory.

More specifically, on the one hand, such an arrangement does not permit the structural dimensional tolerances of the secondary thermally insulating barrier of each wall to be compensated, due in particular to the tolerance margins during the manufacture of the load-bearing structure. More specifically, the structural tolerances of the load-bearing structure are capable of reaching several centimeters, for example in the order of 4 cm.

Moreover, such an arrangement imposes limitations regarding the dimensions of the tanks which are able to be manufactured. More specifically, the dimension between two angled structures arranged in the region of two opposing corners of a tank wall has to correspond substantially to an integer multiple either of the width or of the length of a standard insulating panel of the secondary thermally insulating barrier.

SUMMARY

An idea underlying the invention is to propose a sealed and thermally insulated tank exhibiting a multilayer structure, which permits at least one of the aforementioned drawbacks of the prior art to be remedied.

According to one embodiment, the invention provides a sealed and thermally insulated tank intended for the storage of a fluid, said tank having a plurality of walls exhibiting a multilayer structure, successively having, in the direction of the thickness from the outside to the inside of the tank, a secondary thermally insulating barrier retained against a load-bearing structure, a secondary sealing membrane borne by the secondary thermally insulating barrier, a primary thermally insulating barrier bearing against the secondary sealing membrane and a primary sealing membrane borne by the primary thermally insulating barrier and designed to be in contact with the fluid contained in the tank;

a first of the walls having a secondary thermally insulating barrier comprising:
   a first insulating panel arranged along the intersection between the load-bearing structure of said first wall and the load-bearing structure of an adjacent second wall; and
   a second insulating panel juxtaposed with the first insulating panel along one edge of said first insulating panel opposing the second wall;
   the first and the second insulating panels each having an internal face opposing the load-bearing structure provided with a small metal plate;
the first wall having a secondary sealing membrane comprising:
   a first metal sheet having at least two perpendicular corrugations and having a first and a second edge which are opposed to one another and which are respectively turned to face the second wall and away from the second wall; the first edge of the first metal sheet being, on the one hand, welded to the small metal plate of the first insulating panel to retain the first metal sheet against the first insulating panel and, on the other hand, welded to a first flange of a metal angle plate which has a second flange welded to the metal sheet of the secondary sealing membrane of the second wall; and
   a second metal sheet having at least two perpendicular corrugations, one of said corrugations being arranged in the extension of one of the corrugations of the first metal sheet, the second metal sheet having a first and a second edge which are opposed to one another and which are respectively oriented toward the second wall and in the direction away from the second wall; the second edge of the second metal sheet being welded to the small metal plate of the second insulating panel;

the second edge of the first metal sheet and the first edge of the second metal sheet being welded together, one edge from the second edge of the first metal sheet and the first edge of the second metal sheet being a joggled edge permitting the first and the second metal sheets to be lap welded to one another.

Thus by producing the seal of the secondary sealing membrane between the first insulating panel and the second insulating panel by means of two sheets, namely the first and the second metal sheets, it is possible to compensate for at least some of the dimensional tolerances of the load-bearing structure by adapting the width of the overlap between the first and the second metal sheets or the width of the second metal sheet.

Similarly, this possibility for adapting the width of the overlap between the first and second metal sheets or the width of the second sheet is also able to permit a greater flexibility when selecting the dimensions of the tank.

Moreover, the dimensions of the second insulating panel are also capable of being adjusted in order to compensate for the manufacturing dimensional tolerances of the secondary thermally insulating barrier and/or in order to be adapted to the desired dimensions of the tank.

Furthermore, the connection of the first and the second metal sheets thus makes it possible to create in the region of a corner of the tank an offset between the metal sheets of the sealing membrane and the insulating panels of the secondary thermally insulating barrier, such that the metal sheets of the secondary sealing membrane in the adjacent planar area are capable of extending across a plurality of insulating panels.

Finally, the secondary sealing membrane has, via the first metal sheet, corrugations as far as the vicinity of the intersection between the two adjacent walls of the tank which enables the tank to be conferred with excellent flexibility in the region of the angled structure.

According to the embodiments, such a sealed and thermally insulating storage of a fluid may have one or more of the following features:

the joggled edge has a width greater than 4 centimeters.

the secondary sealing membrane of the first wall also has in a planar area, extending from the second edge of the second metal sheet toward a third wall opposing the second wall, a plurality of standard metal sheets which each have at least two perpendicular corrugations, one thereof being parallel to the intersection, the corrugations parallel to the intersection of the plurality of standard metal sheets being separated from one another by a standard inter-corrugation distance and wherein a corrugation of the first metal sheet which is parallel to the intersection is separated from a corrugation of the second metal sheet which is parallel to the intersection by an inter-corrugation distance which is different from the standard inter-corrugation distance. In other words, the inter-corrugation distance between a corrugation of the first metal sheet which is parallel to the intersection and a corrugation of the second metal sheet which is parallel to the intersection and adjacent thereto has a dimension which is different from the standard inter-corrugation distance between two corrugations parallel to said intersection in a standard planar area of the wall.

the second edge of the first metal sheet and the first edge of the second metal sheet are welded to one another perpendicular to an interstice separating the first and second insulating panels.

the first insulating panel is combined with the second insulating panel by means of a plurality of coupling elements, each coupling element being, on the one hand, fixed to an edge of the internal face of the first insulating panel and, on the other hand, fixed to an opposing edge of the internal face of the second insulating panel so as to oppose a mutual separation of the first and second insulating panels.

the coupling elements are coupling plates which each have an external face bearing against the internal face of the first and the second insulating panels and an external face, at least one of the coupling plates having an internal face provided with a small metal plate, the second edge of the first metal sheet and the first edge of the second metal sheet being welded to said small metal plate.

the first metal sheet has a plurality of corrugations extending in a direction which is secant to the second wall and a single corrugation extending along an axis parallel to the intersection between the first and second walls.

the second metal sheet has a plurality of corrugations extending in a direction which is secant to the second wall and a single corrugation or two corrugations each extending along an axis parallel to the intersection between the first and second walls.

the metal angle plate has a corrugation extending from one end to the other end of said metal angle plate, along the first and the second flanges, so as to permit a deformation of the metal angle plate in a direction parallel to the intersection between the first and second walls, said corrugation extending in the extension of one of the corrugations of the first metal sheet which extends in a direction which is secant to the second wall.

the tank comprises a plurality of metal angle plates each having a single corrugation, each of the metal angle plates being welded to the first metal sheet in the extension of a corrugation of the first metal sheet.

the or each metal angle plate is also welded to the metal sheet of the first insulating panel.

the corrugations of the first and the second metal sheets protrude to the outside of the tank in the direction of the load-bearing structure, the internal face of the first and second insulating panels having perpendicular grooves respectively receiving the corrugations of the first and second metal sheets.

the first insulating panel has, in each interval between two grooves which are secant to the second wall, a small metal plate, the first edge of the first metal sheet and the first flange of the metal angle plate or one of the metal angle plates being welded thereto.

the second insulating panel has in each interval between two grooves which are secant to the second wall, a metal sheet, the second edge of the second metal sheet being welded thereto.

the corrugations of the first and the second metal sheets protrude toward the inside of the tank, the primary thermally insulating barrier comprising insulating panels, each having an external face having perpendicular grooves receiving the corrugations of the first and the second metal sheets of the secondary sealing membrane.

the secondary thermally insulating barrier of the first wall also has in a planar area extending from one edge of the second panel opposing the second wall toward a third wall opposing the second wall, a plurality of juxtaposed standard insulating panels each having a rectangular parallelepipedal shape and an internal face opposing the load-bearing wall which is provided with a small metal plate and the secondary sealing membrane of the first wall also has, in a planar area extending from the second edge of the second metal sheet toward the third wall, a plurality of standard metal sheets which each have at least two perpendicular corrugations and which are welded to one another and are each arranged across a plurality of said standard insulating panels and welded to the small metal plates of said standard insulating panels, one of said standard metal sheets bordering the second metal sheet having an edge oriented toward the second wall which is, on the one hand, welded to the small metal plate of the second insulating panel and, on the other hand, welded to the second edge of the second metal sheet.

the standard insulating panels have identical dimensions and the second insulating panel has a dimension in a direction extending from an edge oriented facing the second wall toward an edge opposing the second wall which is different from the corresponding dimension of the standard insulating panels.

the primary thermally insulating barrier of the first panel has a first insulating block which is fixed to the first insulating panel of the secondary thermally insulating barrier by means of a fixing member and the first metal sheet has an orifice for the passage of the fixing member and is welded on the periphery of said orifice to the fixing member.

according to one embodiment, the first insulating block is fixed to the first insulating panel by means of a threaded pin passing through an orifice formed in said first insulating block, said threaded pin cooperating with a threaded bore formed in a cap nut, said cap nut traversing the orifice formed in the first metal sheet and having a threaded portion cooperating with a threaded bore formed in a small anchoring plate fixed to the first insulating panel, the cap nut also having a flange which presses the first metal sheet against the first insulating panel and which is welded to the first metal plate on the periphery of said orifice.

the first insulating panel forms with a first insulating panel of the second wall a preassembled angled structure forming a corner of the tank at the intersection between the first and second walls.

Such a tank may form part of a land-based storage installation, for example to store LNG, or may be installed in a floating structure, onshore or offshore, in particular an LNG carrier, a floating storage and regasification unit (FSRU), a floating production, storage and offloading unit (FPSO) and the like.

According to one embodiment, a marine vessel for the transport of a cold liquid product has a double hull and an aforementioned tank arranged in the double hull.

According to one embodiment, the invention also provides a method for the supply or discharge to or from such a marine vessel, wherein a fluid is conducted via insulated pipelines from or to a floating or land-based storage installation to or from the tank of the marine vessel.

According to one embodiment, the invention also provides a system for transferring a fluid, the system comprising the aforementioned marine vessel, insulated pipelines being arranged so as to connect the tank installed in the hull of the marine vessel to a floating or land-based storage installation and a pump for conducting a fluid through the insulated pipelines from or to the floating or land-based storage installation, to or from the tank of the marine vessel.

The invention is based on the idea of providing a sealed and insulated multilayer structure which is easy to implement on extensive surfaces.

BRIEF DESCRIPTION OF THE DRAWINGS

The invention will be understood more clearly and further objects, details, features and advantages thereof will appear more clearly during the following description of several particular embodiments of the invention provided solely by way of illustrative and non-limiting example with reference to the accompanying drawings.

FIG. 3 is a perspective view showing the secondary thermally insulating barrier in the region of a corner area of the tank.

FIG. 4 is a perspective view illustrating the secondary thermally insulating barrier and the secondary sealing membrane in the region of a corner area of the tank.

DETAILED DESCRIPTION OF EMBODIMENTS

Conventionally, the terms "external" and "internal" are used to define the relative position of one element to another, with reference to the inside and the outside of the tank.

Figure 1:
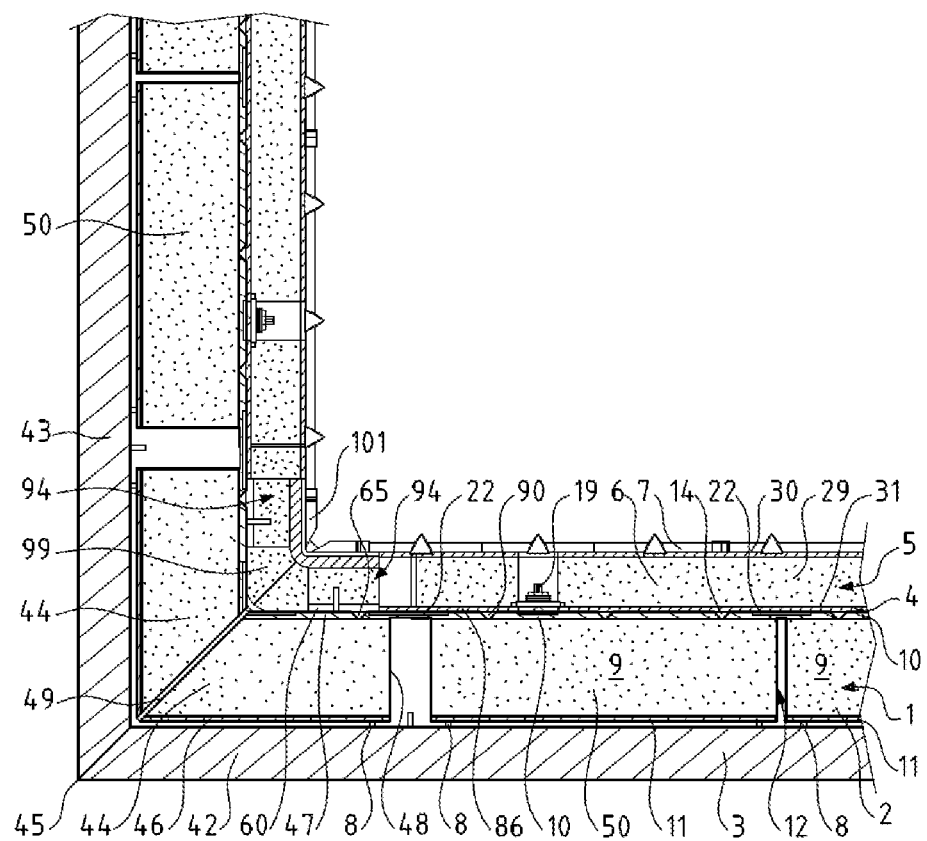
FIG. 1 is a sectional view of a sealed and thermally insulated tank for the storage of a fluid in the region of a corner area between two walls.
Figure 2:
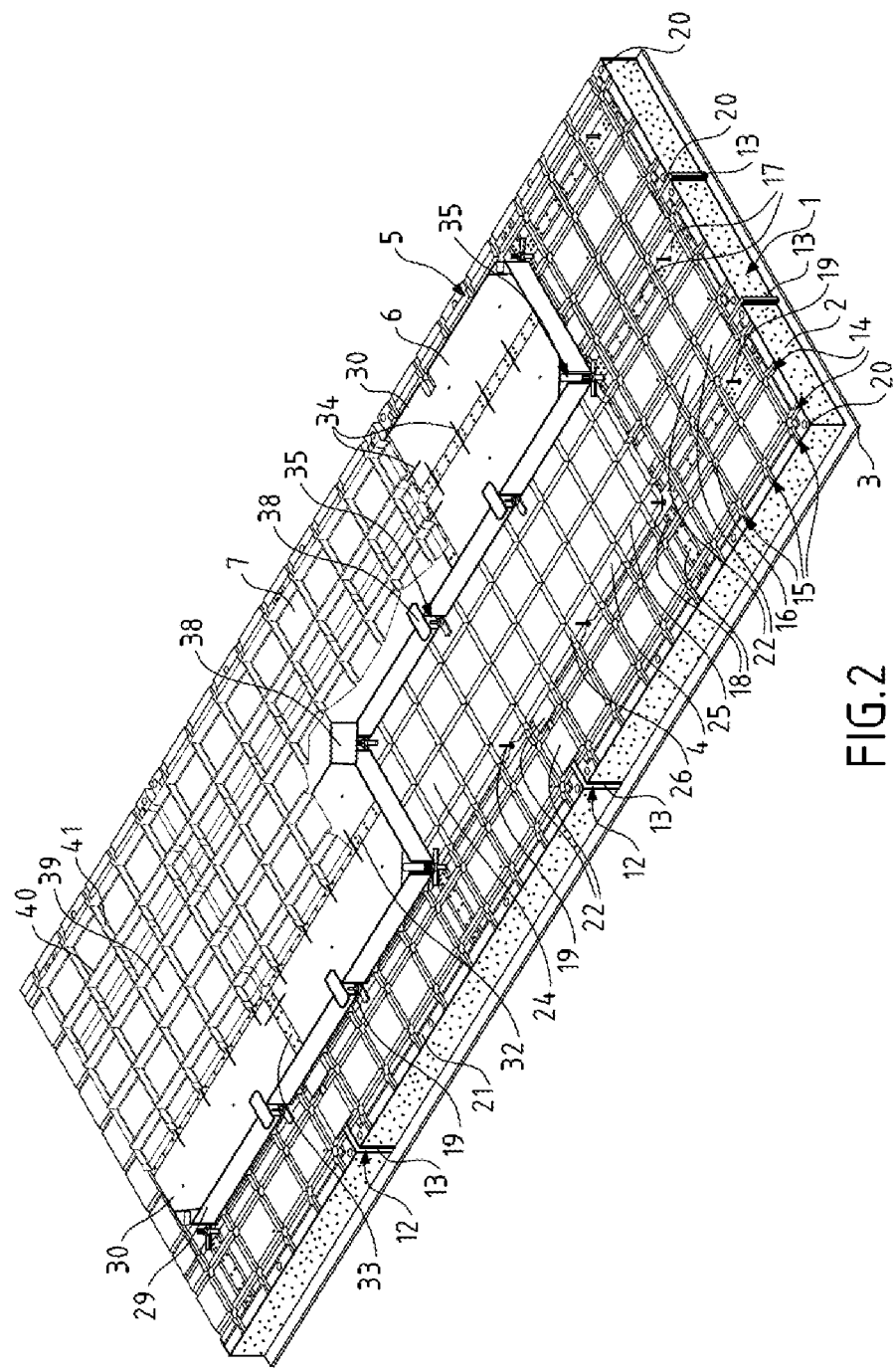
FIG. 2 is a cutaway perspective view of a planar area of a tank wall.

With regard to FIGS. 1 and 2, the multilayer structure of a sealed and thermally insulated tank for storing liquefied natural gas is disclosed. Each wall of the tank has, from the outside to the inside of the tank, a secondary thermally insulating barrier 1 having insulating panels 2 which are juxtaposed and anchored to a load-bearing structure 3 by secondary retaining members 8, a secondary sealing membrane 4 borne by the insulating panels 2 of the secondary thermally insulating barrier 1, a primary thermally insulating barrier 5 having insulating panels 6 which are juxtaposed and anchored to the insulating panels 2 of the secondary thermally insulating barrier 1 by primary retaining members 19 and a primary sealing member 7 borne by the insulating panels 6 of the primary thermally insulating barrier 5 and designed to be in contact with the liquefied natural gas contained in the tank.

The load-bearing structure 3 may be formed, in particular, by self-supporting metal sheets or, more generally, any type of rigid partition having the appropriate mechanical properties. The load-bearing structure 3 may be formed, in particular, by the hull or the double hull of a marine vessel. The load-bearing structure 3 has a plurality of walls defining the overall shape of the tank, generally a polyhedral shape.

The secondary thermally insulating barrier 1 has a plurality of insulating panels 2 anchored to the load-bearing structure 3 by means of beads of resin, not illustrated, and/or pins 8 welded to the load-bearing structure 3.

As illustrated in FIG. 1, the insulating panels 2 each have a layer of insulating polymer foam 9 sandwiched between a rigid internal plate 10 and a rigid external plate 11. The internal 10 and external 11 rigid plates are, for example, sheets of plywood bonded to said layer of insulating polymer foam 9. The insulating polymer foam may, in particular, be a polyurethane-based foam. The polymer foam is advantageously reinforced by glass fibers which contribute to reducing its coefficient of thermal contraction.

In a planar area of a wall, as shown in FIG. 2, the insulating panels 2 have a substantially rectangular parallelepipedal shape and are juxtaposed along rows which are parallel and separated from one another by interstices 12 which ensure functional mounting clearance. The insulating panels 2 have, for example, a length of 3 m and a width of 1 m. The interstices 12 are filled with a heat-insulating lining 13 shown in FIG. 2 such as glass wool, rock wool or flexible synthetic foam with open cells, for example. The heat-insulating lining 13 is advantageously produced from a porous material so as to create spaces for the flow of gas in the interstices 12 between the insulating panels 2. The interstices 12 have, for example, a width in the order of 30 mm.

As shown in FIG. 2, the internal plate 10 of the insulating panels 2 has two series of grooves 14, 15 perpendicular to one another, so as to form a network of grooves. Each of the series of grooves 14, 15 is parallel to two opposing sides of the insulating panels 2. The grooves 14, 15 are designed for the reception of corrugations, protruding to the outside of the tank, formed on the metal sheets of the secondary sealing membrane 4.

In the embodiment shown, in the planar area of the wall, each internal plate 10 has three grooves 14 extending in the longitudinal direction of the insulating panel 2 and nine grooves 15 extending in the transverse direction of the insulating panel 2.

The grooves 14, 15 pass partially or entirely through the thickness of the internal plate 10 and in this last case open into the region of the layer of insulating polymer foam 9. Moreover, in the intersecting areas between the grooves 14, 15, the insulating panels 2 have clearance orifices 16 formed in the layer of insulating polymer foam 9. The clearance orifices 16 permit the accommodation of joining areas formed in the intersections between the corrugations of the metal sheets of the secondary sealing membrane 4.

Moreover, the internal plate 10 is provided with small metal plates 17, 18 for anchoring the edge of the corrugated metal sheets of the secondary sealing membrane 4 to the insulating panels 2. The small metal plates 17, 18 extend in two perpendicular directions which are each parallel to two opposing sides of the insulating panels 2. The small metal plates 17, 18 are fixed to the internal plate 10 of the insulating panel 2 by screws, rivets or staples, for example. The small metal plates 17, 18 are positioned in recesses formed in the internal plate 10 such that the internal surface of the small metal plates 17, 18 comes into contact with the internal surface of the internal plate 10.

The internal plate 10 is also provided with threaded pins 19 protruding toward the interior of the tank and designed to ensure the fixing of the primary thermally insulating barrier 5 to the insulating panels 2 of the secondary thermally insulating barrier 1.

In order to ensure the fixing of the insulating panels 2 to the pins 8 fixed to the load-bearing structure 3, the insulating panels 2 are provided with cylindrical recesses 20 shown in FIG. 2, traversing the insulating panels 2 over their entire thickness and formed in the region of each of the four corners of the insulating panels 2. The cylindrical recesses 20 have a change of cross section, not shown, defining the bearing surfaces for nuts cooperating with the threaded ends of the pins 8.

Moreover, the internal plate 10 has along its edges in each interval between two successive grooves 14, 15 a set-back portion receiving coupling plates 22 which are each arranged across two adjacent insulating panels 2, straddling the interstice 12 between the insulating panels 2. Each coupling plate 22 is fixed to each of the two adjacent insulating panels 2 so as to oppose the mutual separation thereof. The coupling plates 22 have a rectangular parallelepipedal shape and, for example, consist of a sheet of plywood. The external face of the coupling plates 22 is fixed to the bottom of the set-back portions 21. The depth of the set-back portions 21 is substantially equal to the thickness of the coupling plates 22 such that the internal face of the coupling plates 22 reaches substantially as far as the region of the other planar areas of the internal plate 10. Thus, the coupling plates 22 are able to ensure a continuity in the bearing of the secondary sealing membrane 4.

So as to ensure a good distribution of the connecting forces between the adjacent panels, a plurality of coupling plates 22 extends along each edge of the internal plate 10 of the insulating panels 2, one coupling plate 22 being arranged in each interval between two adjacent grooves 14, 15 of a series of parallel grooves. The coupling plates 22 may be fixed to the internal plate 10 of the insulating panels 2 by any appropriate means. However, it has been observed that the combination of the application of an adhesive between the external face of the coupling plates 22 and the internal plate 10 of the insulating panels 2 and the use of mechanical fixing members such as staples, permitting the coupling plates 22 to be pressed against the insulating panels 2, was particularly advantageous.

The secondary sealing membrane 4 has a plurality of corrugated metal sheets 24, each having a substantially rectangular shape. The corrugated metal sheets 24 are arranged offset relative to the insulating panels 2 of the secondary thermally insulating barrier 1 such that each of said corrugated metal sheets 24 extends jointly over four adjacent insulating panels 2. Each corrugated metal sheet 24 has a first series of parallel corrugations 25 extending in a first direction and a second series of parallel corrugations 26 extending in a second direction. The directions of the series of corrugations 25, 26 are perpendicular. Each of the series of corrugations 25, 26 is parallel to two opposing edges of the corrugated metal sheet 24. The corrugations 25, 26 protrude toward the outside of the tank, i.e. in the direction of the load-bearing structure 3. The corrugated metal sheet 24 has a plurality of planar surfaces between the corrugations 25, 26. In the region of each intersection between two corrugations 25, 26, the metal sheet has a joining area having a top portion protruding toward the outside of the tank. The corrugations 25, 26 of the corrugated metal sheets 24 are accommodated in the grooves 14, 15 formed in the internal plate 10 of the insulating panels 2. The adjacent corrugated metal sheets 24 are welded together so as to overlap. The anchoring of the corrugated metal sheets 24 to the small metal plates 17, 18 is implemented by tack welds.

The corrugated metal sheets 24 have, along their longitudinal edges and in the region of their four corners, cutouts 28 permitting the passage of pins 19 designed to ensure the fixing of the primary thermally insulating barrier 5 to the secondary thermally insulating barrier 1.

The corrugated metal sheets 24 are, for example, produced from Invar®: i.e. an alloy of iron and nickel, the coefficient of expansion thereof typically being between $1.2 \times 10^{-6}$ and $2 \times 10^{-6}$ $K^{-1}$ or an alloy of iron of high manganese content, the coefficient of expansion thereof being typically in the order of $7 \times 10^{-6}$ $K^{-1}$. Alternatively, the corrugated metal sheets 24 may also be produced from stainless steel or aluminum.

The primary thermally insulating barrier 5 has a plurality of insulating panels 6 of substantially rectangular parallelepipedal shape. The insulating panels 6 have dimensions equal to the dimensions of an insulating panel 2, apart from the thickness which may be different and preferably less than that of the insulating panel 2. The insulating panels 6 in this case are offset relative to the insulating panels 2 of the secondary thermally insulating barrier 1 such that each insulating panel 6 extends over four insulating panels 2 of the secondary thermally insulating barrier 1.

The insulating panels 6 have a structure which is similar to that of the insulating panels 2 of the secondary thermally insulating barrier 1, namely a sandwich structure consisting of a layer of insulating polymer foam sandwiched between two rigid plates, for example made of plywood.

The internal plate 30 of an insulating panel 6 of the primary thermally insulating barrier 5 is provided with small metal plates 32, 33 for anchoring the corrugated metal sheets of the primary sealing membrane 7. The small metal plates 32, 33 extend in two perpendicular directions which are each parallel to two opposing edges of the insulating panels 6.

The small metal plates 32, 33 are fixed in recesses formed in the internal plate 30 of the insulating panel 5 and fixed thereto by screws, rivets or staples, for example.

Moreover, the internal plate 30 of the insulating panel 6 is provided with a plurality of stress-relieving slots 34 permitting the primary sealing membrane 7 to be deformed without imposing significant mechanical stresses on the insulating panels 6. Such stress-relieving slots 34 are disclosed, in particular, in the document FR 3001945.

The fixing of the insulating panels 6 of the primary thermally insulating barrier 5 to the insulating panels 2 of the secondary thermally insulating barrier is provided by means of threaded pins 19. In order to achieve this, each insulating panel 6 has a plurality of cutouts 35 along its edges and in the region of its corners, a threaded pin 19 extending therein. The external plate of the insulating panels 2 protrudes inside the cutouts 35 so as to form a bearing surface for a retaining member which has a threaded bore which is slipped onto each threaded pin 19. The retaining member has lugs housed inside the cutouts 35 and bearing against the portion of the external plate protruding inside the cutout 35 so as to sandwich the external plate between a lug of the retaining member and an insulating panel 2 of the secondary thermally insulating barrier 1 and thus to provide the fixing of each insulating panel 6 to the insulating panels 2 which it straddles.

The primary thermally insulating barrier 5 has a plurality of closure plates 38 permitting the bearing surface of the primary sealing membrane 7 to be complemented in the region of the cutouts 35.

The primary sealing membrane 7 is obtained by assembling a plurality of corrugated metal sheets 39. Each corrugated metal sheet 39 has a first series of parallel corrugations 40, called upper corrugations, extending in a first direction and a second series of parallel corrugations 41, called lower corrugations, extending in a second direction perpendicular to the first series. The corrugations 40, 41 protrude toward the interior of the tank. The corrugated metal sheets 39 are, for example, produced in stainless steel or in aluminum. In one embodiment, not illustrated, the first and the second series of corrugations have identical heights.

Returning to FIG. 1, the structure of the walls of the tank in the region of a corner between a first wall 42 and a second wall 43 is observed.

The angle formed between the first wall 42 and the second wall 43 is approximately 90° in the embodiment shown. The angle may, however, have any other value, for example in the order of 135°.

The secondary thermally insulating barrier 1 of each wall 42, 43 has a set of first insulating panels 44 which are each arranged along the intersection 45 between the load-bearing structure 3 of the first wall 42 and the load-bearing structure 3 of the second wall 43. Each first insulating panel 44 has a section in the form of a rectangular trapezium so as to form with the first insulating panel 44 of the other adjacent wall a corner of the secondary thermally insulating barrier 1.

Thus, each first insulating panel 44 of the secondary thermally insulating barrier 1 has an external face 46 fixed to the load-bearing structure 3, an internal face 47 for supporting the secondary sealing membrane 4, an edge 48 opposing the intersection 45 between the load-bearing structures 3 of the first and the second walls 42, 43 which is perpendicular to the internal 46 and external 47 faces and an edge 49 adjacent to the intersection 45 which is chamfered and cooperates with a chamfered edge 49 of the first insulating panel 44 of the other wall so as to form a corner of the secondary insulating thermally barrier 1. Each first insulating panel 44 also has two parallel terminal edges, opposing one another in the direction of the intersection 45, which are perpendicular to the internal face 46, the external face 47 and the edge 48 opposing the intersection 45.

According to one embodiment, the first insulating panels 44 of each of the walls 42, 43 are connected together by adhesive bonding via their chamfered edge 49 so as to form a preassembled angled structure.

Moreover, the secondary thermally insulating barrier 1 of each wall 42, 43 also has a set of second insulating panels 50 which are juxtaposed with the set of first insulating panels 44 and extend along the edge 48 of the first insulating panels 44 which faces away from the intersection 49. In the embodiment shown, the second insulating panels 50 have a similar structure to that of the other insulating panels 2 disclosed relative to FIG. 2.

The second insulating panels 50 are, however, capable of having different widths from that of the insulating panels 2. The width of said second insulating panels 50 is more specifically capable of being adapted in order to compensate for the manufacturing dimensional tolerances of the secondary thermally insulating barrier and/or in order to adapt to the desired dimensions of the tank. Thus, in the embodiment shown, if the second insulating panels 50 each have three grooves 14 extending in the longitudinal direction of said second insulating panel 50 and have, as a result, a width substantially corresponding to three inter-corrugation intervals as the other standard insulating panels 2 of the secondary thermally insulating barrier 1, they may also have a different width, such as for example a width corresponding substantially to two inter-corrugation intervals, according to the dimensions of the tank which it is desired to produce.

Each first insulating panel 44 is connected to the adjacent second insulating panel 50 by means of a plurality of coupling elements 22 which are, on the one hand, fixed to an edge of the internal face 47 of the first insulating panel 44 and to an edge of the internal face 10 of the adjacent second insulating panel 50 so as to oppose a mutual separation of the adjacent first and second insulating panels 44, 50.

With regard to FIG. 3, the structure of the first insulating panels 44 of the secondary thermally insulating membrane 1 is observed in detail.

The first insulating panels 44 have a sandwich structure consisting of a layer of insulating polymer foam 51 sandwiched between two rigid plates 52, 53, for example made of plywood.

The internal plate 52 of the first insulating panels 44 has a network of perpendicular grooves 54, 55 designed to receive the corrugations of a set of first metal sheets of the secondary sealing membrane 4. The internal plate 52 has a single groove 54 extending parallel to the intersection 45 between the load-bearing structure 3 of the first wall 42 and that of the second wall 43. The internal plate 52 also has a plurality of grooves 55 perpendicular to said single groove 54 which are parallel to one another and spaced apart from one another in the direction of the intersection 45.

The internal plate 52 of the first insulating panels 44 is also provided with a plurality of small metal plates 56, for example made from Invar and designed for anchoring the edges of first metal sheets of the secondary sealing membrane which will be described in detail hereinafter. The small metal plates 56 are arranged in two perpendicular directions which are respectively parallel to the two terminal edges 58, 59 of said first insulating panel 54 and the edge 48 of said first insulating panel 44 which faces away from the intersection 45. The small metal plates 56 are also designed for the anchoring of metal angle plates which permit the seal of the secondary sealing membrane to be ensured in the angled area and which will be described in detail hereinafter. The small metal plates 56 are fixed in recesses formed in the internal plate 52 of the first insulating panel 44 and fixed thereto by screws, rivets or staples, for example.

In the embodiment shown, one of the small metal plates 56 designed for anchoring the metal angle plates is arranged in each of the intervals between two corrugations 55. Moreover, the internal plate 52 is also overlapped by heat protection elements 57, for example formed by a composite film, which are arranged in the areas which, on the one hand, are opposite the welding area of the metal angle plates on the first metal sheets and, on the other hand, are not overlapped by small metal plates 56. The heat protection elements 57 thus permit the first insulating panels 44 and, in particular, their layer of polymer foam 51 to be protected against temperatures which are liable to damage them during welding operations of the metal angle plates and the first metal sheets.

The internal plate 52 is also provided with small anchoring plates 58 designed to ensure the fixing of insulating blocks of the primary thermally insulating barrier against the first insulating panels 44 of the secondary thermally insulating barrier 1. The small anchoring plates 58 are, for example, adhesively bonded to the internal plate 52.

With regard to FIG. 4, the structure of the secondary sealing membrane 4 in the region of a corner of the tank is observed.

The secondary sealing membrane 4 of each wall 42, 43 has a set of first metal sheets 60 of substantially rectangular overall shape. The first metal sheets 60 have opposing first and second edges 61, 62, parallel to the intersection between the two walls. The first edge 61 faces toward the other adjacent wall and the second edge 62 faces away from the other adjacent wall. The first metal sheets 60 also have a third and a fourth edge 63, 64 which are parallel and which are perpendicular to the first and second edges 61, 62.

The first metal sheets 60 each have a single corrugation 65 extending in a direction parallel to the first and the second edges 61, 62. The first metal sheets 60 also have a series of several corrugations 66 perpendicular to said corrugation 65, i.e. parallel to the third and fourth edges 63, 64. By way of example, the first metal sheets 60 have in this case a series of nine corrugations 66 perpendicular to the single corrugation 65. The corrugations 65, 66 protrude toward the exterior of the tank in the direction of the load-bearing structure 3 and are each received in one respective groove 54, 55 formed in the internal plate 52 of one of the first insulating panels 44.

Each of the first metal sheets 60 is arranged across two adjacent first insulating panels 44 and anchored to each of said insulating panels. To achieve this, the first edges 61 of the first metal sheets 60 are welded to the small metal plates 56 whilst their third and fourth edges 63, 64 are welded perpendicular to a heat protection element 105. The first metal sheets 60 are also sealingly welded in order to overlap one another in the region of their third and fourth edges 63, 64.

Moreover, the secondary sealing membrane 2 has a plurality of metal angle plates 67. The metal angle plates 67 are advantageously produced in a material which is identical to that of the other metal sheets 24, 60 of the secondary sealing membrane 4.

Each metal angle plate 67 has two flanges which are respectively parallel to each of the two adjacent walls 42, 43. Each metal angle plate 67 has a corrugation 68 extending from one end to the other end of the metal angle plate 67 along its two flanges so as to permit a deformation of the metal angle plate 67 in a direction parallel to the intersection between the load-bearing structures of the two adjacent walls 42, 43. The secondary sealing membrane 4 has a metal angle plate 67 for each of the directions of corrugations 66, the corrugation 68 of said metal angle plate extending in the extension of one of the corrugations 66 so as to ensure a continuity in the network of corrugations of the secondary sealing membrane 4 in the region of the corner of the tank.

Each metal angle plate 67 is welded to two small metal plates 56 of the first insulating panel 44 of the first wall 42 by one of its flanges and is welded to two small metal plates 56 of the first insulating panel of the second wall 43 by the other of its flanges. Each flange is welded to a small metal plate 56 in its angled area between one of its lateral edges and its terminal edge opposing the other flange.

Figure 5:
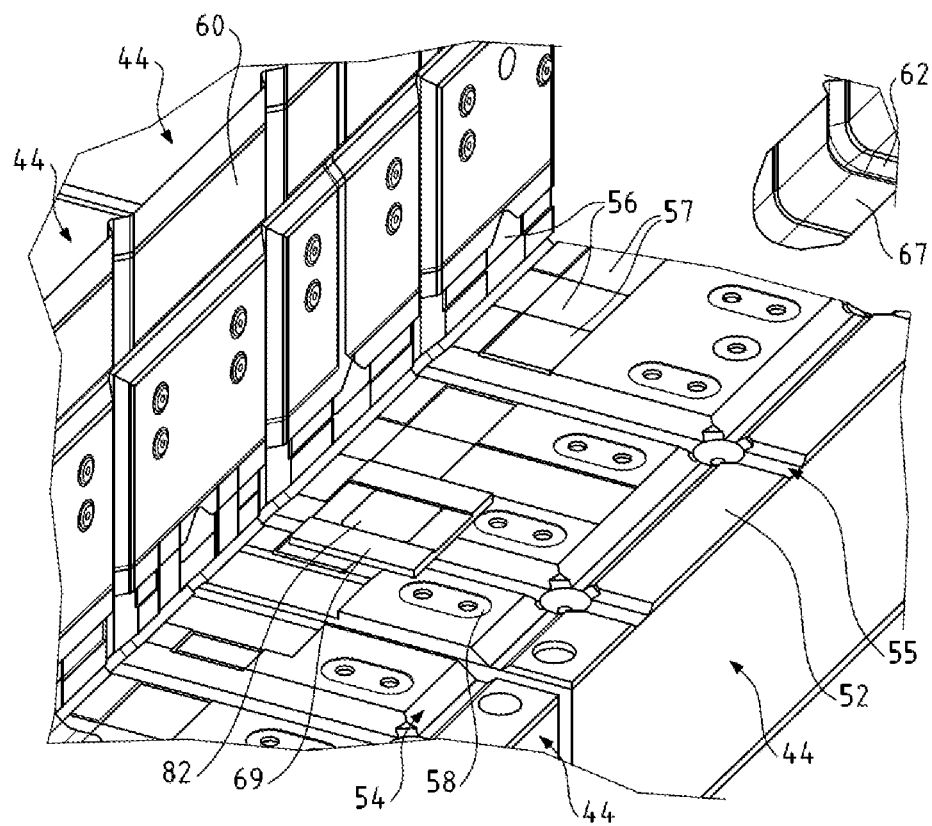
FIG. 5 is a partially exploded view of the secondary thermally insulating barrier and of the secondary sealing membrane in the region of an interstice between two adjacent first insulating panels.

Moreover, with regard to FIG. 5, it is observed that the adjacent first insulating panels 44 of the same wall are combined together by means of a coupling plate 69 which is fixed to the internal face 52 of each of the two first adjacent insulating panels 44. The internal face of the coupling plate 69 is partially overlapped by a small metal plate 82 which extends in the positioning direction of the small metal plates 56 and permits an anchoring of the two metal angle plates 67 and a first metal sheet 60 in the region of the interstice separating two adjacent first insulating panels 44. In a version which is not shown, the small metal plate 82 is replaced by a heat protection element and a small metal plate is applied to the internal face of the metal angle plates 67 and of the first metal sheets 60.

As shown in FIG. 4, the first edge 61 of each of the first metal sheets 60 is sealingly welded to one of the flanges of the metal angle plates 67.

Moreover, the first metal sheets 60 have a plurality of orifices 83, an anchoring member passing therethrough and permitting an insulating block of the primary thermally insulating barrier to be anchored. With regard to FIGS. 6 and 7, it is observed that a cap nut 84 traverses each of the orifices 83. The cap nut 84 has on its external periphery a threaded portion cooperating with a threaded bore formed in one of the small anchoring plates 58. Moreover, the cap nut 84 has a threaded blind bore designed to receive a pin for fixing the insulating blocks of the thermally insulating barrier. The cap nut 84 also has a flange 85 permitting the first metal sheet 60 to be sandwiched between said flange 85 and the small anchoring plate 58. According to one embodiment, each flange 85 is welded to the first metal sheet 60 on the periphery of the orifice 83 in order to ensure the seal of the secondary sealing membrane.

Figure 6:
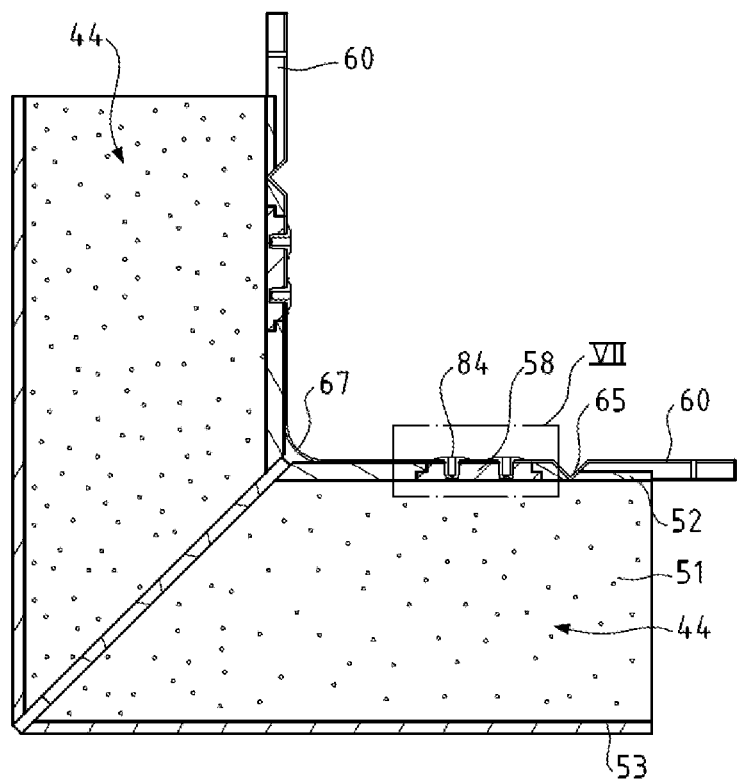
FIG. 6 is a sectional view partially illustrating the secondary thermally insulating barrier and the secondary sealing membrane in the region of a corner area of the tank.
Figure 7:
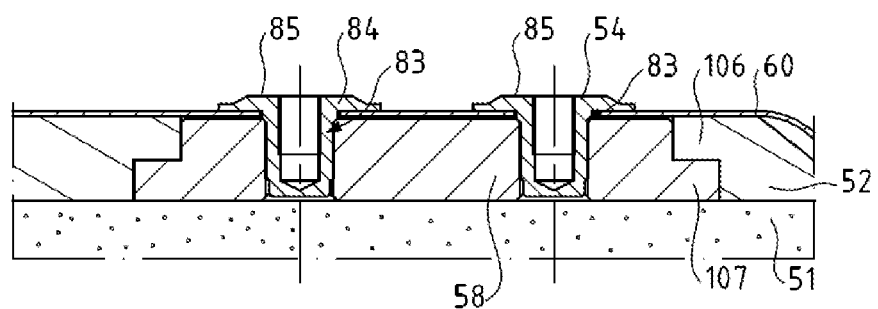
FIG. 7 is a detailed view of the area VII of FIG. 6.

In the variant shown in FIGS. 6 and 7, each small anchoring plate 58 is retained on one of the first insulating panels 44 by means of the internal plate 52. To achieve this, the small anchoring plate 58 is received in a housing of the internal plate 52. Moreover, the internal plate 52 has an edge 106 which partially overlaps the housing and overlaps a portion of the edge 107 of the small anchoring plate 58 so as to retain said small anchoring plate 58 against the layer of insulating polymer foam 51. In such an embodiment, in order to ensure the fixing of each small anchoring plate 58 to one of the insulating panels 44, the small anchoring plate 58 is previously attached to the layer of insulating polymer foam 51 before the internal plate 52 is fixed, for example by adhesive bonding, to the layer of insulating polymer foam 51. In addition, each small anchoring plate 58 may also be fixed by adhesive bonding to the insulating layer of polymer foam 51.

Figure 15:
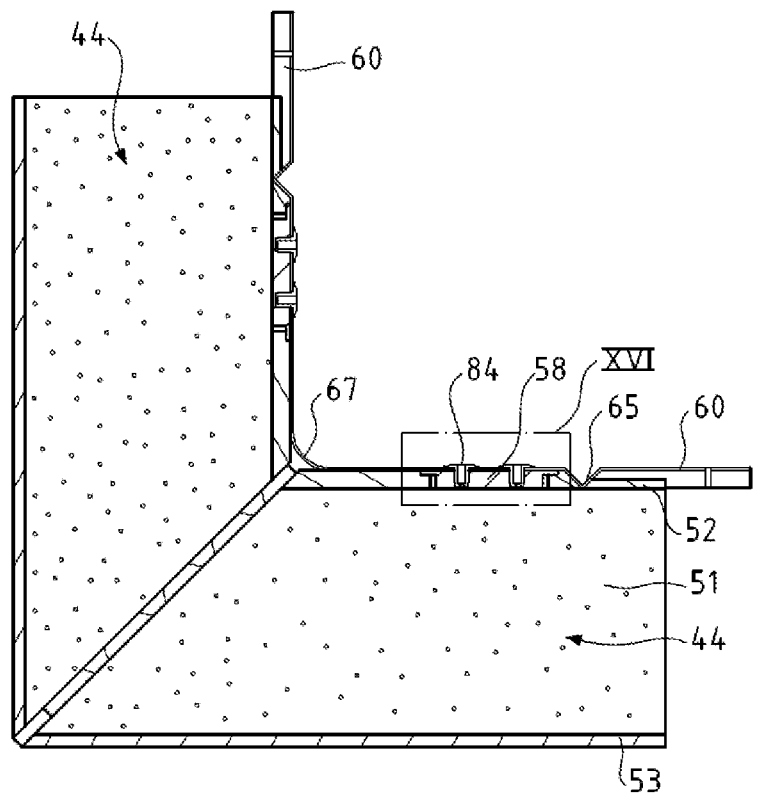
FIG. 15 is a sectional view partially illustrating the secondary thermally insulating barrier and the secondary sealing membrane in the region of a corner area of the tank according to a variant.
Figure 16:
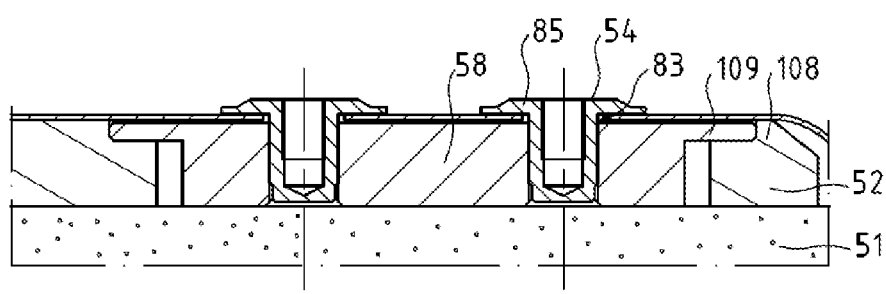
FIG. 16 is a detailed view of the area XVI of FIG. 15.

In a further variant, shown in FIGS. 15 and 16, each small anchoring plate 58 is not retained on one of the insulating panels 44 by means of its internal plate 52 and each small anchoring plate 58 is fixed by adhesive bonding to the layer of insulating polymer foam 51 of the respective insulating panel 44. Each small anchoring plate 58 is placed in a housing formed in the internal plate 52 of the respective insulating panel 44. Advantageously, the housing formed in the internal plate 52 has a shoulder 108 serving as a bearing surface for an internal edge portion 109 of the small anchoring plate 58.

According to further embodiments, not shown, each small anchoring plate 58 may be overlapped by a layer of plywood provided with orifices permitting the passage of cap nuts 85. The layer of plywood contributes in this case to ensuring the support of the first metal sheets 60.

Figure 8:
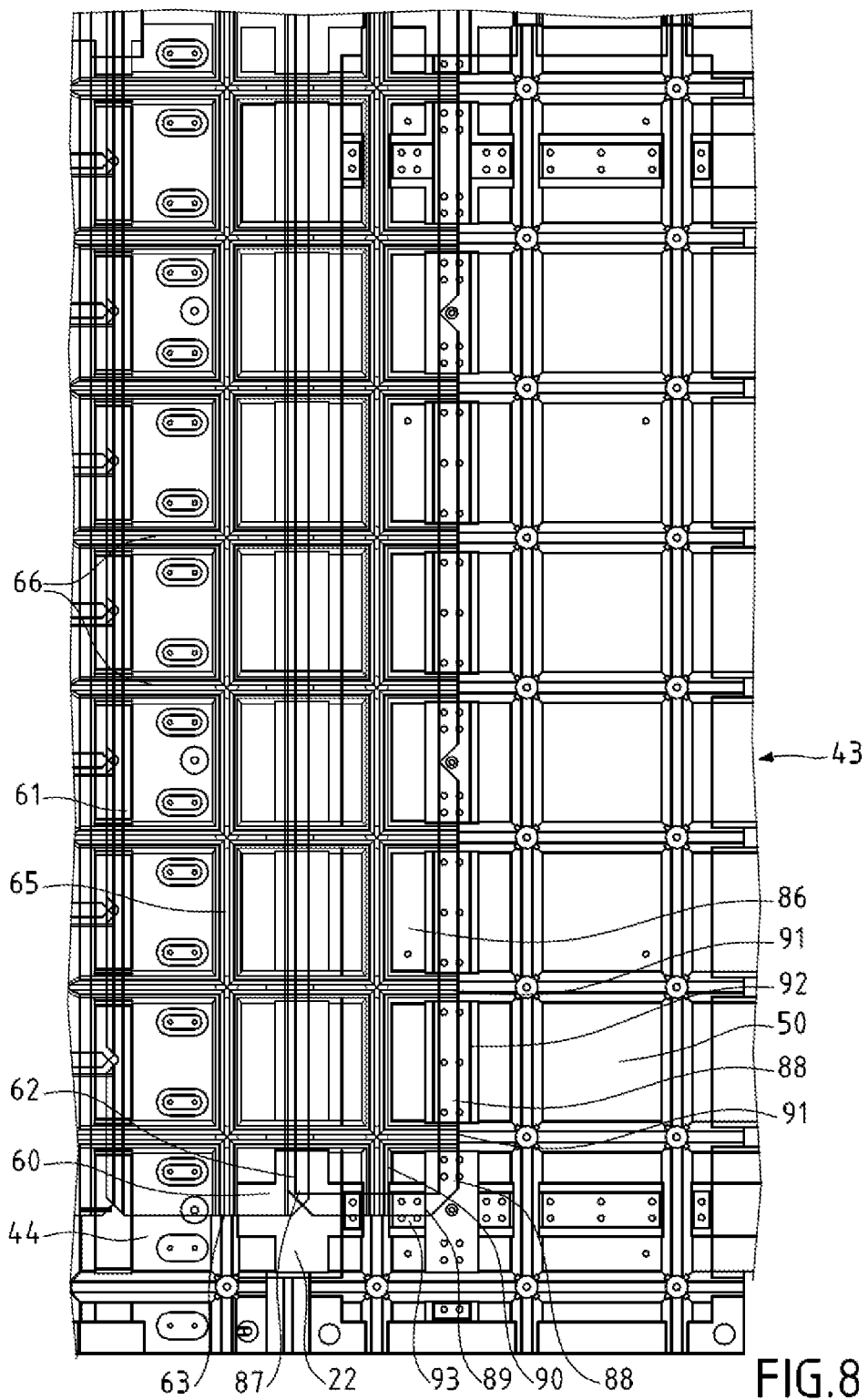
FIG. 8 is a view from above partially illustrating the secondary sealing membrane of one of the walls in the region of a corner of the tank.

Moreover, with regard to FIG. 8, it is observed that the secondary sealing membrane 4 of each wall has a set of second metal sheets 86 which are, on the one hand, anchored to the second insulating panels 50 and, on the other hand, welded to the first metal sheets 60.

The second metal sheets 86 have a substantially rectangular overall shape which is defined by a first and a second edge 87, 88 which oppose one another and which are parallel to the adjacent intersection between the two walls 42, 43. The first edge 87 faces toward the adjacent corner of the tank whilst the second edge 88 faces in a direction away from this corner. The second metal sheets 86 also have a third and a fourth edge 89, only one thereof being shown here, which are parallel and which are perpendicular to the first and second edges 87, 88.

In the embodiment shown, the second metal sheets 86 each have a single corrugation 90 extending in a direction parallel to the first and second edges 87, 88. The first metal sheets also have a series of a plurality of corrugations 91 perpendicular to said corrugation 90, i.e. parallel to the third and fourth edges 89. By way of example, the second metal sheets 86 have in this case a series of nine corrugations 91.

In a further embodiment, not shown, the second metal sheets 86 may also have two corrugations 90 extending in a direction parallel to the first and second edges 87, 88, in particular if it is desired to produce a different offset of the metal sheets 24 of the planar area relative to the standard insulating panels 2 of the secondary thermally insulating barrier 1.

The corrugations 90, 91 protrude toward the outside of the tank in the direction of the load-bearing structure 3 and are each received in one respective groove formed in the internal plate of one of the second insulating panels 50.

Each of the second metal sheets 86 is arranged across two adjacent second insulating panels 50 and is anchored to each of them. To achieve this, the second insulating panels 50 have small metal plates 92, 93, which extend in two perpendicular directions and which are each parallel to two opposing sides of the second insulating panels 50. The second edge 88 of each of the second metal sheets 86 is welded to the small metal plates 92 and their third and fourth edges 89 are welded to the small metal plates 93. The second small metal plates 86 are also sealingly welded to overlap one another in the region of their third and fourth edges 89.

Moreover, the first edge 87 of each of the second metal sheets 86 is sealingly welded to the second edge 62 of one of the first metal sheets 60. One edge from the second edge 62 of the first metal sheets 60 and the first edge 87 of the second metal sheets 86 has a joggled portion, i.e. a part having a height difference, as a result of which it surmounts the other edge. In the embodiment shown, the joggled portion is formed in the second edge 87 of the first metal sheets 60.

According to one embodiment, the second joggled edge 62 has sufficient dimensions that an adaptation of the width, by which the first metal sheets 60 and the second metal sheets 86 overlap, is at least able to compensate for the structural tolerances of the secondary thermally insulating barrier 1 and the secondary sealing membrane 4 of the relevant wall. According to one embodiment, the joggled edge has a width greater than or equal to 4 cm.

According to a further embodiment, the width of the first metal sheets 60 is adapted in order to compensate for the manufacturing tolerances of the load-bearing structure 3.

The first edges 87 of the second metal sheets 86 and the second edges 62 of the first metal sheets 60 are welded together perpendicular to the interstice separating the first insulating panels 44 from the second insulating panels 50. Thus, the first edges 87 of the second metal sheets 86 and the second edges 62 of the first metal sheets 62 bear against the coupling plates 22 combining the first insulating panels 44 and the second insulating panels 50.

According to one embodiment, some or all of said coupling plates 22 are provided on their internal face with heat protection elements, not shown, the first edges 87 of the second metal sheets 86 and the second edges 62 of the first metal sheets 60 which are welded to one another bearing thereagainst.

Moreover, from the second edge 88 of the second metal sheets 86, oriented in a direction opposing the corner of the neighboring tank, the secondary sealing membrane 4 has a plurality of standard metal sheets 24—i.e. of the type provided in a planar area as disclosed with regard to FIG. 2. The standard metal sheets 24 bordering the second metal sheets 86 are arranged across two second insulating panels 50 and two standard insulating panels 2, the anchoring of said standard metal sheets 24 on the second insulating panels 50 being implemented by means of the small metal plates 92, 93.

Figure 9:
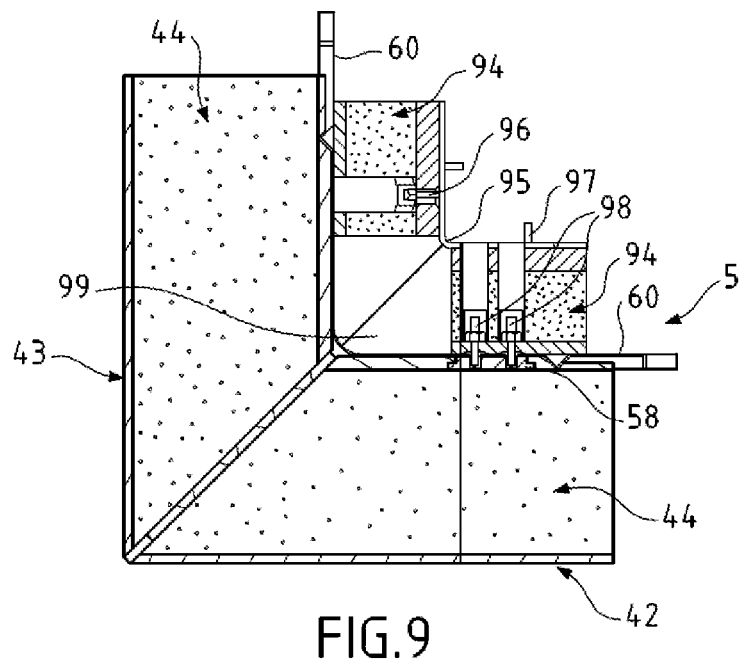
FIG. 9 is a sectional view illustrating the secondary thermally insulating barrier, the secondary sealing membrane and the primary thermally insulating barrier in the region of a corner area of the tank.
Figure 10:
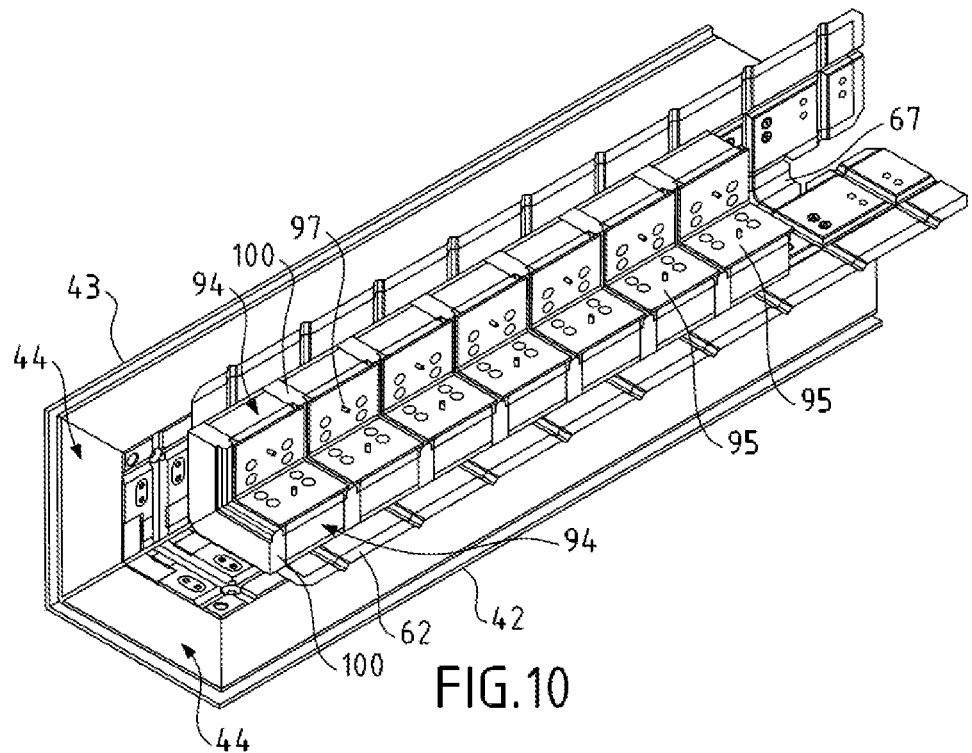
FIG. 10 is a perspective view illustrating the secondary thermally insulating barrier, the secondary sealing membrane and the primary thermally insulating barrier in the region of a corner area of the tank.

With regard to FIGS. 9 and 10, it is observed that the primary thermally insulating barrier 5 has in the region of the corner of the tank a plurality of preassembled pairs of insulating blocks 94, one thereof bearing against one of the first metal sheets 60 of the first wall 42 and being anchored to one of the first insulating panels 44 of the first wall 42, whilst the other thereof bears against one of the first metal sheets 60 of the second wall 43 and is anchored to one of the first insulating panels 44 of the second wall 43.

The insulating blocks 94 have an internal face, an angle plate 95 bearing thereagainst, and an external face bearing against one of the first metal sheets 60. The insulating blocks 94 have a composite structure and have a layer of insulating polymer foam sandwiched between two sheets of plywood adhesively bonded to said layer of polymer foam.

The angle plates 95 are metal angle plates, for example, produced from stainless steel. The angle plates 95 have two flanges respectively bearing against the internal face of each of the insulating blocks 94 of a pair of insulating blocks. With regard to FIG. 9 it is observed that each flange of an angle plate has pins 96 for fixing to the insulating blocks 94 which are welded to the external face of said flange and protrude toward the interior of the tank. The insulating blocks 94 have orifices which permit the passage of pins 96 and are formed on their internal face. The orifices communicate with cylindrical recesses opening into the external face of the insulating blocks. Nuts screwed to the pins 96 bear against the base of the cylindrical recesses and thus ensure the fixing of the angle plate 95 to said insulating blocks 94. The angle plate 95 thus permits the insulating blocks 94 to be connected in pairs, so as to form preassembled modules.

Each flange of each angle plate 95 also has a pin 97 on its internal face, protruding toward the interior of the tank. Such pins 97 permit welding equipment to be anchored during the welding of the elements of the primary sealing membrane 7 to the angle plates 95.

In order to ensure the fixing of the insulating blocks 94 to the first insulating panels 44 of the secondary thermally insulating barrier 1, the angle plate 95 and the insulating blocks 94 are provided with orifices permitting the passage of pins 98. The pins 98 are each designed to cooperate with one of the cap nuts 84 as described above with regard to FIG. 7.

Moreover, an angled connector 99 made of insulating material, such as a polymer foam, is arranged between the edges adjacent to the corner of the tank of the two insulating blocks 94 and thus permits a continuity of the thermal insulation to be ensured in the region of the corner of the tank. Moreover, insulating joint elements 100 are inserted between two pairs of adjacent insulating blocks 94 so as to ensure a continuity of the thermal insulation.

Figure 11:
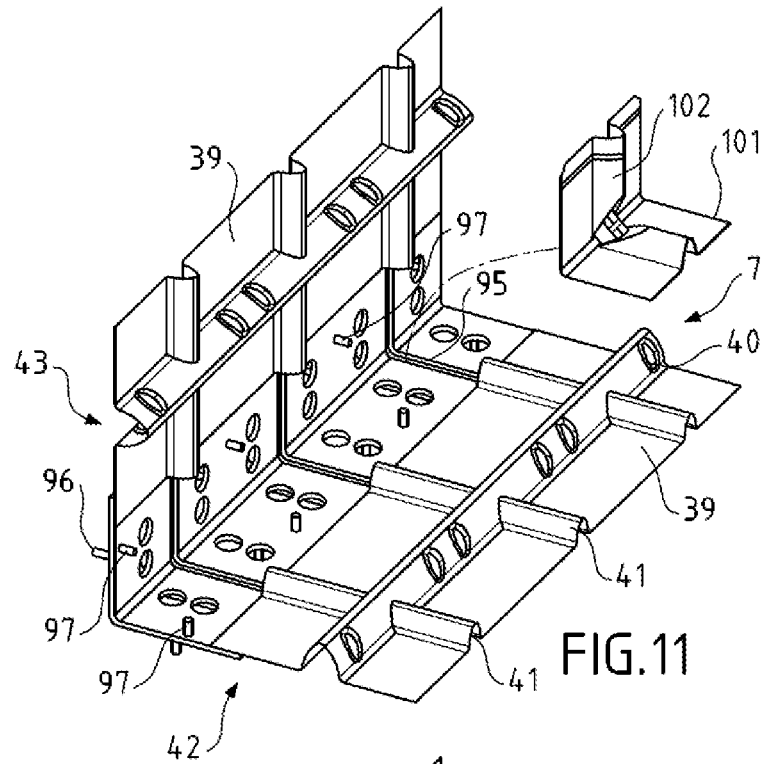
FIG. 11 is an exploded perspective view illustrating the primary sealing membrane in the region of a corner area of the tank.
Figure 12:
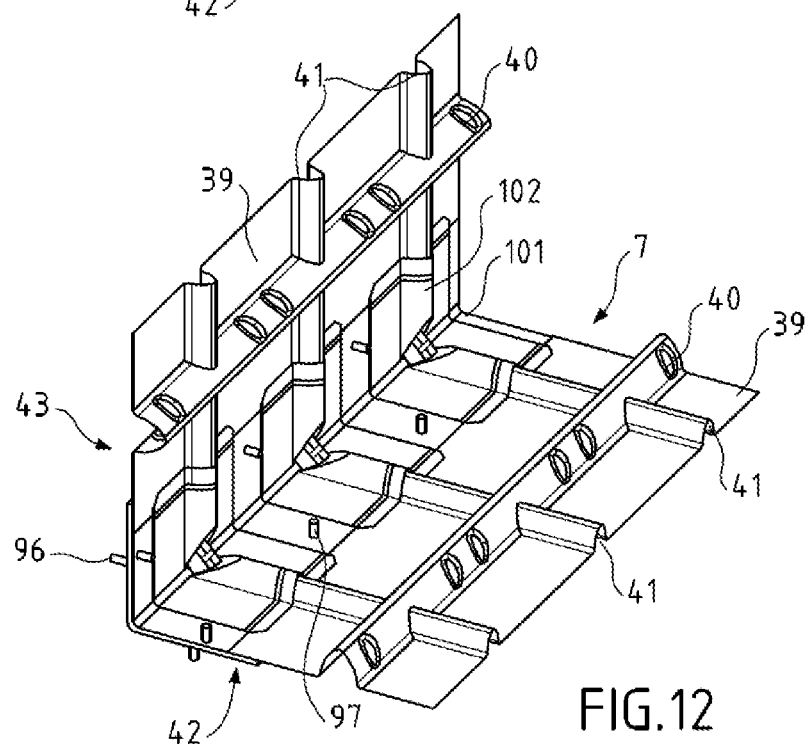
FIG. 12 is a perspective view illustrating the primary sealing membrane in the region of a corner area of the tank.

As shown in FIGS. 11 and 12, the metal sheets 39 of the primary sealing membrane 7 which border the angled area are welded along their edge oriented toward the corner of the tank on the angle plates 95. Moreover, the primary sealing membrane 7 has a plurality of metal angled parts 101 which are each welded so as to overlap two adjacent angle plates 95. The angled parts 101 are produced from a material identical to that of the other metal sheets 39 of the primary sealing membrane 7. Each angled part 101 has two flanges which are respectively parallel to each of the two adjacent walls 42, 43. Each angled part 101 has a corrugation 102 extending from one end to the other of the angled part 101 along the two flanges so as to permit a deformation of the angled part 101 in a direction parallel to the ridge formed at the intersection of the walls 42. 43.

The corrugation 102 of each of the angled parts 101 extends in the extension of one of the directions of corrugations 41 of the primary sealing membrane 7 so as to ensure a continuity of the network of corrugations of the primary sealing membrane 7 in the region of the corner of the tank.

It should be noted that whilst just one of the corners of the tank has been disclosed above, the other corners of the tank may also have an identical arrangement.

Figure 17:
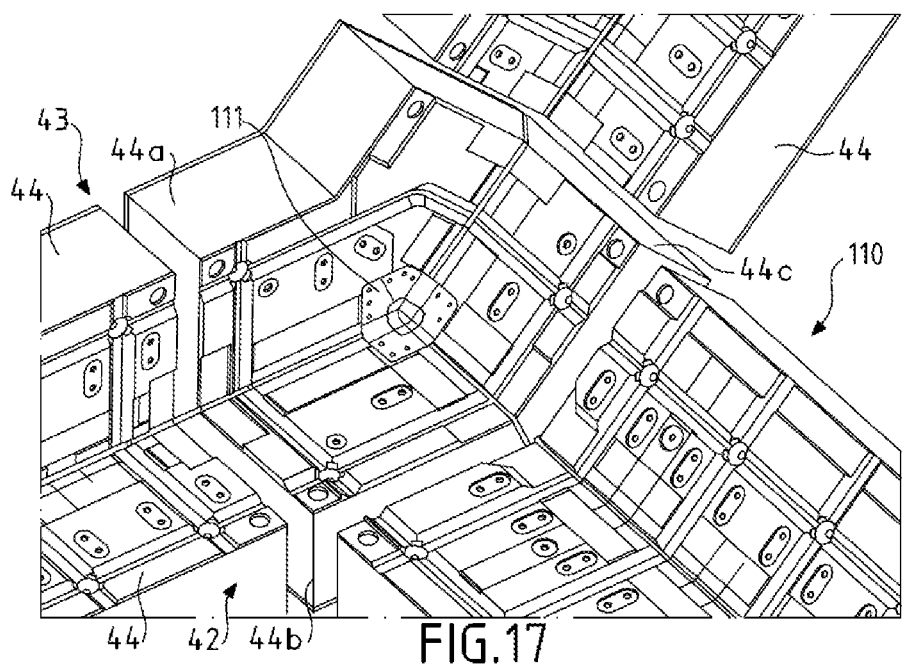
FIG. 17 is a perspective view showing the secondary thermally insulating barrier at the intersection between three walls of the tank.
Figure 18:
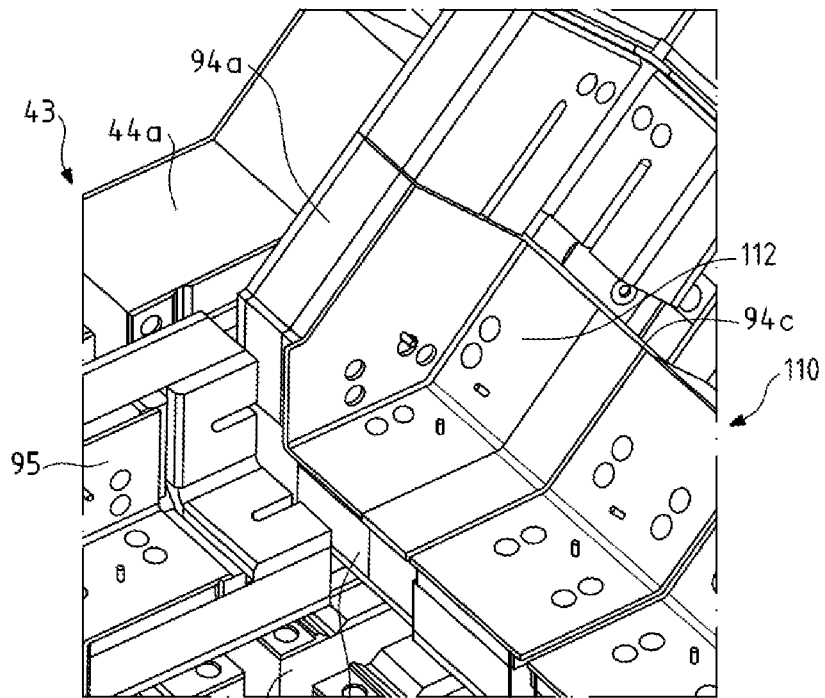
FIG. 18 is a perspective view partially showing the secondary thermally insulating barrier and the primary thermally insulating barrier at the intersection between three walls of the tank.

In FIGS. 17 and 18, the structure of the secondary 1 and primary 5 thermally insulating barriers at the intersection between three walls 42, 43, 110 is observed. The three walls which are shown here respectively constitute a bottom wall 42, an end wall 43 and a lower oblique wall 110. The lower oblique wall 110 forms an angle of 135° with the bottom wall 42. The lower oblique wall 110 and the bottom wall 42 are perpendicular to the end wall 43. Such an arrangement corresponds, for example, to a tank which has a generally polyhedral shape and which has two end walls of octagonal shape which are connected to one another by eight walls, namely a bottom wall and a horizontal top wall, two vertical lateral walls, two lower oblique walls, each connecting one of the lateral walls to the top wall, and two lower oblique walls, each connecting one of the lateral walls to the bottom wall.

In this area, as shown in FIG. 17, the secondary thermally insulating barrier 1 has a preassembled angled structure which is formed by a set of three first insulating panels 44*a*, 44*b*, 44*c* which are respectively fixed against the load-bearing structure of each of the three walls 42, 43, 110. The insulating panels 44*a*, 44*b*, 44*c* each have a sandwich structure which is identical to that of the insulating panels 44 disclosed with regard to FIG. 3, namely consisting of a layer of insulating polymer foam sandwiched between two rigid plates, for example made of plywood.

The insulating panels 44*b* and 44*c* are fixed together via chamfered edges having an inclination of 67.5°. Moreover, the insulating panels 44*b* and 44*c* are each fixed to the insulating panel 44*a* via chamfered edges having an inclination of 45°. It is also observed that the insulating panel 44*a* does not have a parallelepipedal shape but a V-shape, the angle thereof corresponding to the angle between the bottom wall 42 and the lower oblique wall 110.

Moreover, an angled part 111, which is made of metal and sealed, shown in FIG. 17, is fixed across the three insulating panels 44*a*, 44*b*, 44*c*. To achieve this, the angled part 111 has three flanges which are respectively parallel to each of the three walls 42, 43, 110. The angled part 111 is advantageously produced from a material which is identical to that of the other metal sheets 24, 60 of the secondary sealing membrane 4.

Moreover, in this area, the secondary sealing membrane 4 also has metal angle plates which each have two flanges which are respectively parallel to two adjacent walls. The metal angle plates have an identical structure to that described above with regard to FIG. 4. Moreover, in this area, the secondary sealing membrane has single corrugated metal sheets, not shown. The secondary sealing membrane 4, in particular anchored to each of the insulating panels referenced 44*b* and 44*c*, has a corrugated metal sheet which has only two corrugations perpendicular to one another extending in the extension of the other corrugations. Two edges of said sheet which face an adjacent wall are welded to said insulating panels 44*c* or 44*d* and welded to metal angle plates. The other edges, which face away from adjacent walls, are each welded so as to overlap the third or fourth edge of a first adjacent metal sheet. This lap welding is carried out by means of a joggled edge having sufficient dimensions that an adaptation of the width of the overlap is at least able to compensate for the structural tolerances of the secondary thermally insulating barrier 1 and of the secondary sealing membrane 4.

Moreover, as shown in FIG. 18, in the region of the intersection between the three walls 42, 43, 110 the primary thermally insulating barrier 5 has a preassembled angled structure which consists of three insulating blocks 94*a*, 94*b*, 94*c* respectively bearing against each of the three insulating panels 44*a*, 44*b*, 44*c*. The insulating blocks 94*a*, 94*b*, 94*c* are anchored to their respective insulating panel 44*a*, 44*b*, 44*c* by means of threaded pins which pass through orifices formed in said insulating blocks 94*a*, 94*b*, 94*c* and which each cooperate with a cap nut 84 as disclosed with regard to FIG. 7. Moreover, the insulating blocks 94*a*, 94*b*, 94*c* each have an internal face, an angled part 112 having three flanges bearing respectively against each of said insulating blocks 94*a*, 94*b*, 94*c* bearing against said internal face.

Figure 19:
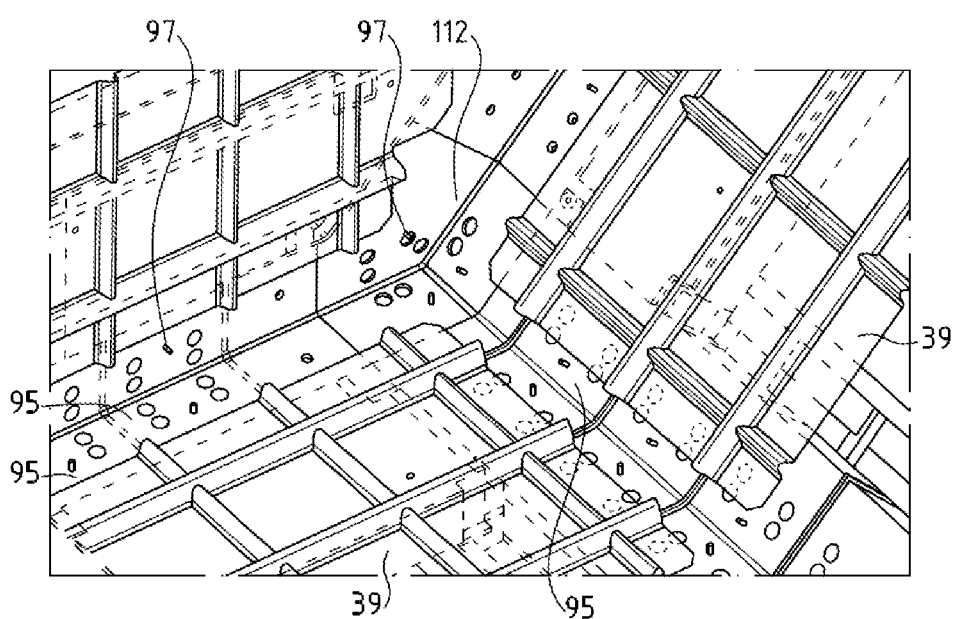
FIG. 19 is a perspective view partially showing the primary sealing membrane at the intersection between three walls of the tank.

Moreover, as shown in FIG. 19, each of the metal sheets 39 of the primary sealing membrane 7 which is arranged in the region of a corner of a wall 42, 43, 110 has two edges, facing toward the adjacent walls, which are welded to the angled part 112 and to the adjacent angle plates 95.

Figure 13:
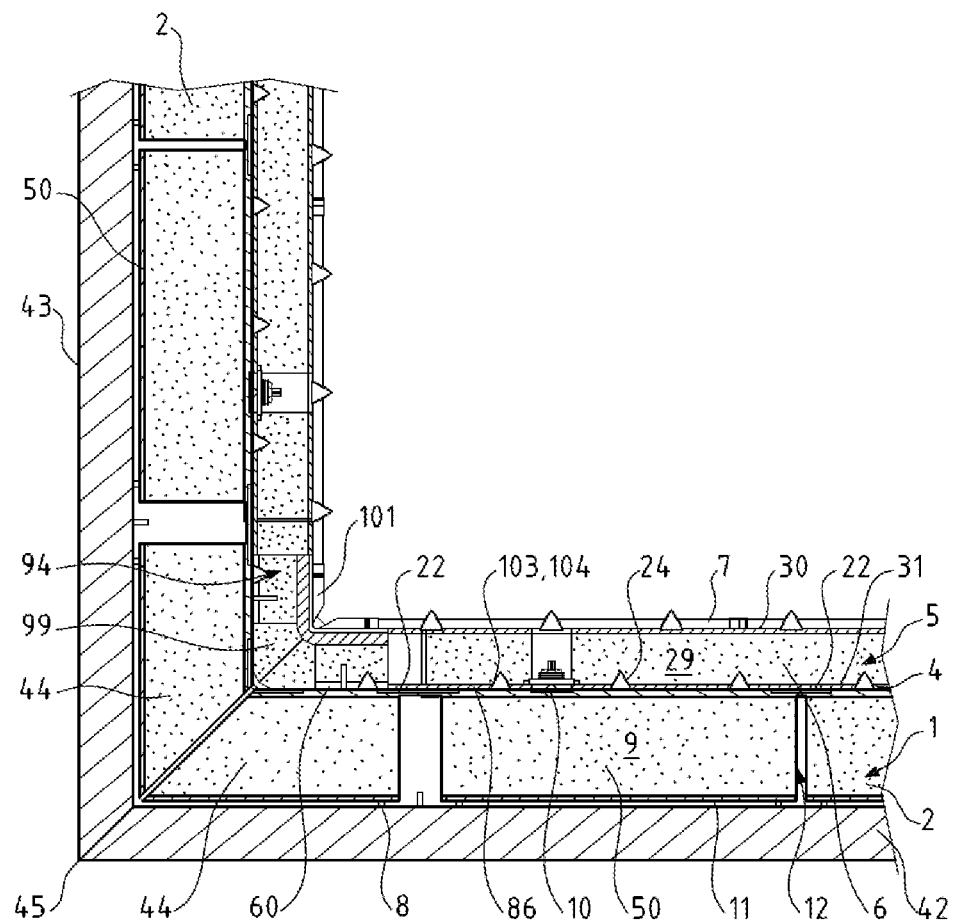
FIG. 13 is a sectional view of a sealed and thermally insulated tank for storing a fluid according to a further embodiment in the region of a corner area between two walls of the tank.

The embodiment shown in FIG. 13 differs in principle from the embodiment described above in that the secondary sealing membrane 4 has corrugations 103 protruding toward the interior of the tank and not toward the exterior. The standard metal sheets 24 and the first metal sheets 60 and the second metal sheets 86 of the secondary sealing membrane 4 also have two series of perpendicular corrugations 103.

Also in this embodiment, the external plate 30 of the insulating panels 6 and of the insulating blocks 94 of the primary thermally insulating barrier 5 have two series of grooves 104 perpendicular to one another so as to form a network of grooves. The grooves 104 are thus designed to receive corrugations 103, protruding toward the interior of the tank, formed on the metal sheets 24, 60, 86 of the secondary sealing membrane 4.

In such an embodiment, the secondary sealing membrane has an overall structure which is identical to that disclosed above, the only difference being in the orientation of the corrugations 66 toward the interior of the tank.

The technique described above to produce a sealed and thermally insulated tank for storing a fluid may be used in different types of reservoirs, for example to form an LNG reservoir in a land-based installation or in a floating installation, such as an LNG carrier or the like.

Figure 14:
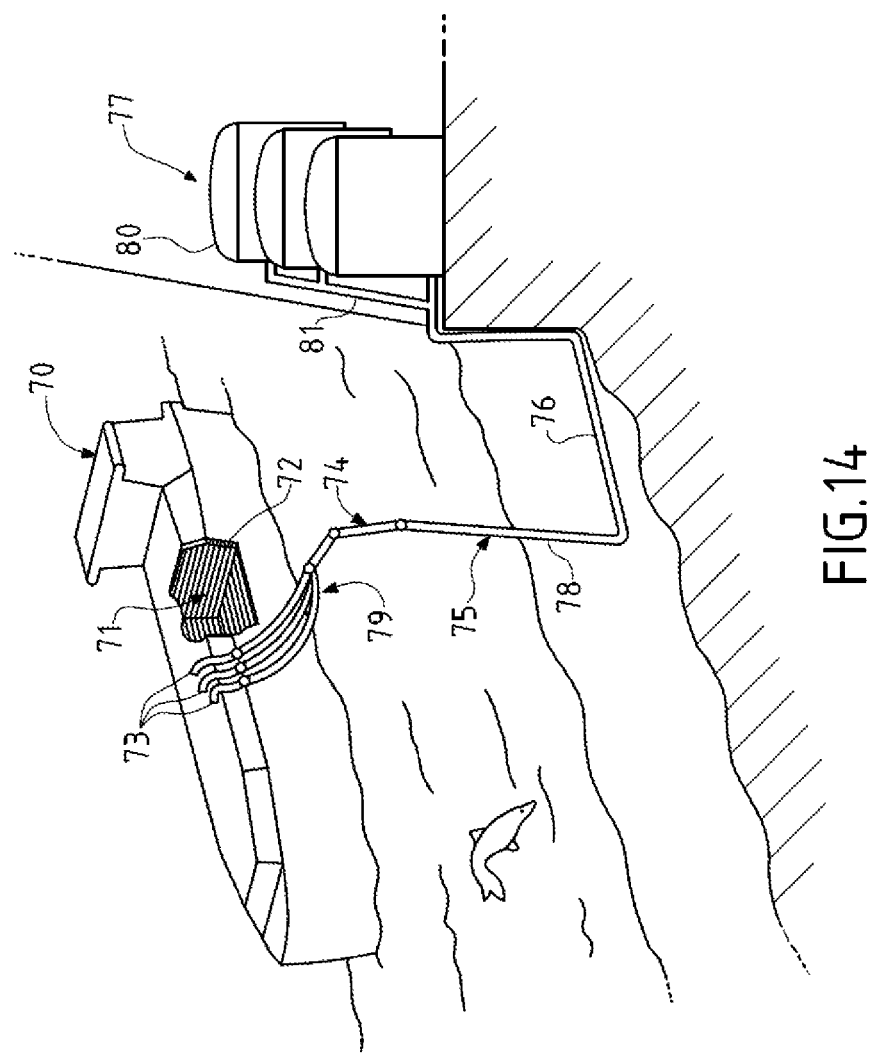
FIG. 14 is a cutaway schematic view of a tank of an LNG carrier and a terminal for the supply/discharge to/from said tank.

With reference to FIG. 14, a cutaway view of an LNG carrier 70 shows a sealed and insulated tank 71 of generally prismatic shape mounted in the double hull 72 of the marine vessel. The wall of the tank 71 has a primary sealing barrier designed to be in contact with the LNG contained in the tank, a secondary sealing barrier arranged between the primary sealing barrier and the double hull 72 of the marine vessel and two insulating barriers respectively arranged between the primary sealing barrier and the secondary sealing barrier and between the secondary sealing barrier and the double hull 72.

In the manner known per se, supply/discharge pipelines 73 arranged on the upper deck of the marine vessel may be connected by means of appropriate connectors to a marine or port terminal to transfer a cargo of LNG from or to the tank 71.

FIG. 14 shows an example of the marine terminal having a supply and discharge station 75, an underwater pipe 76 and a land-based installation 77. The supply and discharge station 75 is a fixed offshore installation having a mobile arm 74 and a tower 78 which supports the mobile arm 74. The mobile arm 74 bears a bundle of insulated flexible pipes 79 which are able to be connected to the supply/discharge pipelines 73. The mobile arm 74, which is orientable, is suitable for all sizes of LNG carrier. A connecting pipe, not shown, extends inside the tower 78. The supply and discharge station 75 permits the supply and discharge to and from the LNG carrier 70 from or to the land-based installation 77. This installation has tanks for storing liquefied gas 80 and connecting pipes 81 connected by the underwater pipe 76 to the supply or discharge station 75. The underwater pipe 76 permits the transfer of the liquefied gas between the supply or discharge station 75 and the land-based installation 77 over a long distance, for example 5 km, which permits the LNG carrier 70 to be kept at a long distance from the shore during the supply and discharge operations.

To produce the required pressure for the transfer of the liquefied gas, pumps on-board the marine vessel 70 and/or pumps fitted in the land-based installation 77 and/or pumps provided on the supply and discharge station 75 are used.

Although the invention has been described in connection with several particular embodiments, it is obvious that it is not limited thereby in any respect and it comprises all the technical equivalents of the means disclosed, in addition to combinations thereof if they fall within the scope of the invention.

The use of the verbs "to consist of" "to comprise" or "to include" and their conjugated forms does not exclude the presence of other elements or other steps from those cited in a claim. The use of the indefinite article "a" or "an" for an element or a step does not exclude the presence of a plurality of such elements or steps unless otherwise specified.

In the claims, any reference between parentheses should not be interpreted as a limitation to the claim.

The invention claimed is:

1. A sealed and thermally insulated tank intended for the storage of a fluid, said tank having a plurality of walls (42, 43) comprising a first wall (42) and an adjacent second wall (43), each of the first wall (42) and the second wall (43) exhibiting a multilayer structure successively having, in the direction of the thickness from the outside to the inside of the tank, a secondary thermally insulating barrier (1) retained against a load-bearing structure (3), a secondary sealing membrane (4) borne by the secondary thermally insulating barrier (1), a primary thermally insulating barrier (5) bearing against the secondary sealing membrane (4) and a primary sealing membrane (7) borne by the primary thermally insulating barrier (5) and designed to be in contact with the fluid contained in the tank;

the secondary thermally insulating barrier (1) of the first wall comprising:
  a first insulating panel (44) arranged along an intersection (45) between the load-bearing structure (3) of said first wall (42) and the load-bearing structure (3) of an adjacent second wall (43) of the plurality of walls (42, 43); and
  a second insulating panel (50) juxtaposed with the first insulating panel (44) along one edge (48) of said first insulating panel (44) opposing the adjacent second wall (43);

the first insulating panel (44) and the second insulating panel (50) each having an internal face (3) opposing the load-bearing structure, the internal face (3) of the first insulating panel (44) being provided with a small metal plate (56) and the internal face (3) of the second insulating panel (50) being provided with at least one small metal plate (92);

the secondary sealing membrane (4) of the first wall (42) comprising:
  a first metal sheet (60) having at least two perpendicular corrugations (65, 66) and having a first edge (61) and a second edge (62) which are opposed to one another and which are parallel to the intersection (45) between the load-bearing structure (3) of said first wall (42) and the load-bearing structure (3) of the adjacent second wall (43), the first edge (61) being closer to the adjacent second wall (43) than the second edge (62); the first edge (61) of the first metal sheet (60) being welded to the small metal plate (56) of the first insulating panel (44) to retain the first metal sheet (60) against the first insulating panel (44) and welded to a first flange of a metal angle plate (67) which has a second flange welded to the metal sheet (60) of the secondary sealing membrane (4) of the adjacent second wall (43); and
  a second metal sheet (86) having at least two perpendicular corrugations (90, 91), one of the at least two perpendicular corrugations (90, 91) being arranged in the extension of one of the at least two perpendicular corrugations (66) of the first metal sheet (60), the second metal sheet (86) having a first edge (87) and a second edge (88) which are opposed to one another parallel to the intersection (45) between the load-bearing structure (3) of said first wall (42) and the load-bearing structure (3) of the adjacent second wall (43), the first edge (87) being closer to the adjacent second wall (43) than the second edge (88) and which are respectively oriented toward the adjacent second wall (43) and in the direction away from the adjacent second wall (43); the second edge (88) of the second metal sheet (86) being welded to the small metal plate (92) of the second insulating panel (50);

the second edge (62) of the first metal sheet (60) and the first edge (87) of the second metal sheet (86) being welded together, one edge from the second edge (62) of the first metal sheet (60) and the first edge (87) of the second metal sheet (86) being a joggled edge permitting the first metal sheets (60) and the second metal sheets (86) to be lap welded to one another.

2. The tank as claimed in claim 1, wherein the joggled edge has a width greater than 4 centimeters.

3. The tank as claimed in claim 1, wherein the secondary sealing membrane (4) of the first wall also has, in a planar area extending from the second edge (88) of the second metal sheet (86) toward a third wall opposing the adjacent second wall (42), a plurality of planar area metal sheets (24) which has corrugations (25, 26) which are parallel to the intersection (45) and are separated from one another by a planar area inter-corrugation distance and wherein the at least two perpendicular corrugations (65, 66) of the first metal sheet comprising a corrugation (65) which is parallel to the intersection (45) and is separated from a corrugation (90) of the at least two perpendicular corrugations (90, 91) of the second metal sheet (86) which is parallel to the intersection (45) by an inter-corrugation distance which is different from the planar area inter-corrugation distance.

4. The tank as claimed in claim 1, wherein the second edge (62) of the first metal sheet (60) and the first edge (87) of the second metal sheet (86) are welded to one another perpendicular to an interstice separating the first insulating panel (44) and second insulating panel (50).

5. The tank as claimed in claim 4, wherein the first insulating panel (44) is combined with the second insulating panel (50) by means of a plurality of coupling elements (22), each coupling element (22) being fixed to an edge of the internal face of the first insulating panel (44) and hand, fixed to an opposing edge of the internal face of the second insulating panel (50) so as to oppose a mutual separation of the first insulating panel (44) and the second insulating panel (50).

6. The tank as claimed in claim 5, wherein the plurality of coupling elements (22) are coupling plates which each have an external face bearing against the internal face of the first insulating panel (44) and the second insulating panel (50) and an external face, at least one of the coupling plates having an internal face provided with a small metal plate, the second edge (62) of the first metal sheet (60) and the first edge (87) of the second metal sheet (86) being welded to said small metal plate.

7. The tank as claimed in claim 1, wherein the at least two perpendicular corrugations (65, 66) of the first metal sheet (60) comprises a plurality of corrugations (66) extending in a direction which is secant to the adjacent second wall (43) and a single corrugation (65) extending along an axis parallel to the intersection between the first wall (42) and the adjacent second wall (43).

8. The tank as claimed in claim 1, wherein the at least two perpendicular corrugations (90, 91) of the second metal sheet (86) comprises a plurality of corrugations (91) extending in a direction which is secant to the adjacent second wall (43) and a single corrugation or two corrugations (90) each extending along an axis parallel to the intersection (45) between the first wall (42) and second wall (43).

9. The tank as claimed in claim 1, wherein the metal angle plate (67) has a corrugation (68) extending from one end to the other end of said metal angle plate (67), along the first flange and the second flanges, so as to permit a deformation of the metal angle plate (67) in a direction parallel to the intersection (45) between the first wall (42) and the adjacent second wall (43), said corrugation (68) extending in the extension of one of the at least two perpendicular corrugations (66) of the first metal sheet (60) which extends in a direction which is secant to the adjacent second wall (43).

10. The tank as claimed in claim 1, wherein the metal angle plate (67) is also welded to the metal sheet (56) of the first insulating panel (44).

11. The tank as claimed in claim 1, wherein the at least two perpendicular corrugations (65, 66) of the first metal sheet (60) and the at least two perpendicular corrugations (90, 91) of the second metal sheet (86) protrude to the outside of the tank in the direction of the load-bearing structure, the internal face of the first insulating panel (44) and the second insulating panel (50) having perpendicular grooves (14, 15, 55, 54) respectively receiving the at least two corrugations (65, 66) of the first metal sheet (60) and the second metal sheet (86).

12. The tank as claimed in claim 11, wherein the perpendicular grooves of the first insulating panel (44) comprising two grooves (55) which are secant to the adjacent second wall (43), the first insulating panels (44) having between the said two grooves (55), a small metal plate (56), the first edge (61) of the first metal sheet (60) and the first flange of the metal angle plate or one of the metal angle plates (67) being welded thereto.

13. The tank as claimed in claim 1, wherein the at least two perpendicular corrugations of the first metal sheet (60) and the at least two perpendicular corrugations of the second metal sheets (60, 86) protrude toward the inside of the tank, the primary thermally insulating barrier (5) comprising insulating panels (4, 94), each having an external face having perpendicular grooves receiving the corrugations (103) of the first metal sheet (60) and the second metal sheet (86) of the secondary sealing membrane (4).

14. The tank as claimed in claim 1, wherein the secondary thermally insulating barrier (1) of the first wall (42) also has in a planar area, extending from one edge of the second insulating panel (50) opposing the adjacent second wall (43) toward a third wall opposing the adjacent second wall (42), a plurality of juxtaposed planar area insulating panels (2), each having a rectangular parallelepipedal shape and an internal face (10) opposing the load-bearing wall (3), the internal face (10) of the juxtaposed planar area insulating panels (2) being provided with a plurality of small metal plates (17, 18) and wherein the secondary sealing membrane (4) of the first wall (42) also has, in a planar area extending from the second edge (88) of the second metal sheet (86) toward the third wall, a plurality of planar area metal sheets (24) which each have at least two perpendicular corrugations (25, 26) and which are welded to one another and are each arranged across a plurality of said juxtaposed planar area insulating panels (2) and welded to the plurality of small metal plates (17, 18) of said juxtaposed planar area insulating panels (2), one of said standard planar area metal sheets (24) bordering the second metal sheet (86) having an edge oriented toward the adjacent second wall (43) which is welded to the small metal plate (92) of the second insulating panel (50) and welded to the second edge (88) of the second metal sheet (86).

15. The tank as claimed in claim 14, wherein the juxtaposed planar area insulating panels (2) have identical dimensions and wherein the second insulating panel (50) has a dimension in a direction extending from an edge oriented facing the adjacent second wall toward an edge opposing the adjacent second wall (43) which is different from the corresponding dimension of the juxtaposed planar area insulating panels (2).

16. The tank as claimed in claim 1, wherein the primary thermally insulating barrier (5) of the first panel (42) has a first insulating block (94) which is fixed to the first insulating panel (44) of the secondary thermally insulating barrier (1) by means of a fixing member (84) and wherein the first metal sheet (60) has an orifice (83) for the passage of the fixing member (84) and is welded on the periphery of said orifice (83) to the fixing member (84).

17. The tank as claimed in claim 16, wherein the first insulating block (94) is fixed to the first insulating panel (44) by means of a threaded pin (98) passing through an orifice formed in said first insulating block (94), said threaded pin (98) cooperating with a threaded bore formed in a cap nut (84), said cap nut (84) traversing the orifice (83) formed in the first metal sheet (60) and having a threaded portion cooperating with a threaded bore formed in a small anchoring plate (58) fixed to the first insulating panel (44), the cap nut (84) also having a flange (85) which presses the first metal sheet (60) against the first insulating panel (44) and which is welded to the first metal sheet (60) on the periphery of said orifice (83).

18. The tank as claimed in claim 1, wherein the first insulating panel (44) forms with a panel (44) of the adjacent second wall (43) a preassembled angled structure forming a corner of the tank at the intersection between the first wall (42) and the adjacent second wall (43).

19. A marine vessel (70) for the transport of a fluid, the marine vessel having a double hull (72) and a tank (71) as claimed in claim 1 arranged in the double hull.

20. A method for the supply or discharge to or from a marine vessel (70) as claimed in claim 19, wherein a fluid is conducted via insulated pipelines (73, 79, 76, 81) from or to a floating or land-based storage installation (77) to or from the tank (71) of the marine vessel.

21. A system for transferring a fluid, the system having a marine vessel as claimed in claim 19, insulated pipelines (73, 79, 76, 81) being arranged so as to connect the tank (71) installed in the hull of the marine vessel to a floating or land-based storage installation (77) and a pump for conducting a fluid through the insulated pipelines from or to the floating or land-based storage installation to or from the tank of the marine vessel.

\* \* \* \* \*